United States Patent [19]

Kitamura et al.

[11] Patent Number: 4,928,234

[45] Date of Patent: May 22, 1990

[54] DATA PROCESSOR SYSTEM AND METHOD

[75] Inventors: Yoshio Kitamura, Kanagawa; Hiroshi Takizuka, Tokyo; Tadao Ishihara, Kanagawa, all of Japan

[73] Assignee: Sony Corporation, Tokyo, Japan

[21] Appl. No.: 266,256

[22] Filed: Nov. 1, 1988

Related U.S. Application Data

[63] Continuation of Ser. No. 807,544, Dec. 11, 1985, abandoned.

[30] Foreign Application Priority Data

Dec. 24, 1984 [JP] Japan ................. 59-280817

[51] Int. Cl.$^5$ ................................ G06F 9/00
[52] U.S. Cl. .................... 364/200; 364/242.6; 364/254; 364/246.1; 364/246; 364/238.4; 364/228.1; 364/230; 364/230.5
[58] Field of Search ............... 364/200 MS File

[56] References Cited

U.S. PATENT DOCUMENTS

| | | | |
|---|---|---|---|
| 3,566,363 | 2/1971 | Driscoll | 364/200 |
| 3,593,300 | 7/1971 | Graham et al. | 364/200 |
| 4,048,623 | 9/1977 | Gruner | 364/200 |
| 4,096,572 | 6/1978 | Naminoto | 364/200 |
| 4,128,876 | 12/1978 | Ames et al. | 364/200 |
| 4,237,534 | 12/1980 | Felix | 364/200 |
| 4,363,094 | 12/1982 | Kaul et al. | 364/200 |
| 4,366,539 | 12/1982 | Johnson et al. | 364/200 |
| 4,371,929 | 2/1983 | Brann et al. | 364/200 |
| 4,383,297 | 5/1983 | Wheatley et al. | 364/200 |
| 4,392,200 | 7/1983 | Arulpragasam et al. | 364/200 |
| 4,400,768 | 8/1983 | Tomlinson | 364/200 |
| 4,449,183 | 5/1984 | Flahive et al. | 364/200 |
| 4,453,211 | 6/1984 | Askinazi et al. | 364/200 |
| 4,470,110 | 9/1984 | Chiarottino et al. | 364/200 |
| 4,473,880 | 9/1984 | Budde et al. | 364/200 |
| 4,481,572 | 11/1984 | Ochsner | 364/200 |
| 4,535,330 | 8/1985 | Carey et al. | 340/825.5 |
| 4,536,839 | 8/1985 | Shah et al. | 340/200 |
| 4,597,054 | 6/1986 | Lockwood et al. | 364/900 |

OTHER PUBLICATIONS

Computer Design, vol. 21, No. 8, 08/82, pp. 52–54, Winchester, Mass., U.S.: T. Williams: "Dimensional Procesisng System Clears Data Transfer Bottlenecks".
Raguskus, Andrew G., "I/O Computer Supercharges Mini Systems", Computer Design, Jul. 15, 1985.
McAlpine, Gary L. and Feldkamp, Gerald B. "A Flexible Environment for High Speed Computing", Computer Design, Jul. 1983.

*Primary Examiner*—Gareth D. Shaw
*Assistant Examiner*—John G. Mills
*Attorney, Agent, or Firm*—Philip M. Shaw, Jr.

[57] ABSTRACT

A system and method for processing an extraordinarily large amount of data is configured using ordinary versatile computers of relatively slow data processing speed. Tasking is shared to plural computers or processors connected to a system bus; a shared storage device provided in common for these processors is made up of plural memory banks connected to the system bus; data transferred between the processors and the memory banks are divided into predetermined amounts of divisional data; the divisional data are processed simultaneously in parallel fashion; and each memory bank is occupied simultaneously in parallel fashion in response to each memory request from each processor. An arbitrator is provided for acting on a single memory request in accordance with a predetermined priority order in the case where plural memory requests are outputted simultaneously to the same memory bank.

19 Claims, 14 Drawing Sheets

FIG.10

| MEMORY BANK DESIG. SIGNAL | PRIORITY | PROCESSOR | | PRIORITY SELECT OUTPUT SIGNAL |
|---|---|---|---|---|
| $\overline{\phi PRQ}_{0j}$ | 0 (HIGH) | P0 | (STS) | $\overline{\phi PRO}_{0j}$ |
| $\overline{\phi PRQ}_{1j}$ | 1 | P1 | (NTS) | $\overline{\phi PRO}_{1j}$ |
| $\overline{\phi PRQ}_{2j}$ | 2 | P2 | (IDS) | $\overline{\phi PRO}_{2j}$ |
| $\overline{\phi PRQ}_{3j}$ | 3 | P3 | (CDS) | $\overline{\phi PRO}_{3j}$ |
| $\overline{\phi PRQ}_{4j}$ | 4 | P4 | (DPS) | $\overline{\phi PRO}_{4j}$ |
| $\overline{\phi PRQ}_{5j}$ | 5 | P5 | (PCS) | $\overline{\phi PRO}_{5j}$ |
| $\overline{\phi PRQ}_{6j}$ | 6 | P6 | (PRELIM.) | $\overline{\phi PRO}_{6j}$ |
| $\overline{\phi PRQ}_{7j}$ | 7 (LOW) | P7 | (PRELIM.) | $\overline{\phi PRO}_{7j}$ |

FIG.11

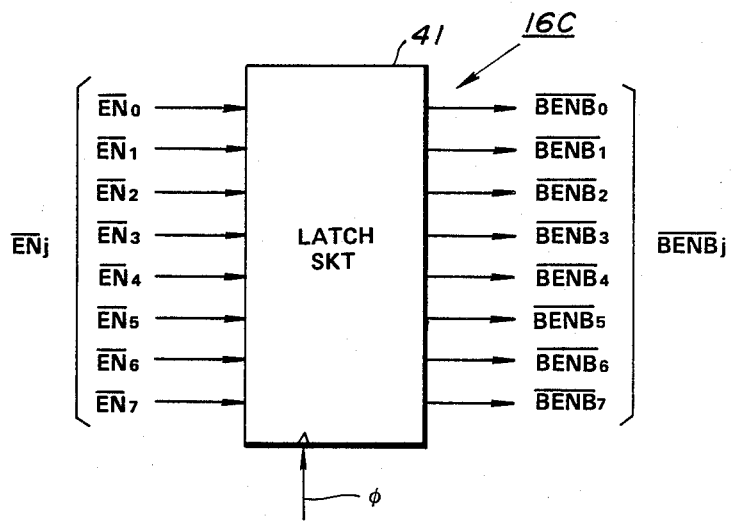

DATA PROCESSOR SYSTEM AND METHOD

This is a continuation of co-pending application Ser. No. 06/807,544 filed on Dec. 11, 1985, now abandoned.

BACKGROUND OF THE INVENTION

1. Field of the Invention

The present invention relates generally to a data processing system and more specifically to a data processing system suitable for processing image information composed of a large amount of digital data indicative of an image including pictures and characters such as in a document or a drawing.

2. Description of the Prior Art

The field in which data processing systems for image information of the above-mentioned kind is applicable is now expanding. Therefore, if document preparation, electronic files, mutual communications, etc. can be configured as a series of systems simply at a low price, it is possible to provide a data processing system useful for general business processing transaction in various fields such as office automation, paperless office, etc.

The image information of this kind, however, includes a great amount of information, about 100 times or more greater than that of the case where the general data coded into a predetermined code are processed (for instance, in numerical value calculations, data processing, word processing, etc.). Therefore, in digitally processing image information, it is necessary to adopt hardware having a throughput 100 times or more greater than that of the case where general data are processed. For these reasons, conventionally, there have been adopted various methods such that a special processor, a special hardware logic, or a large-scale electronic computer all designed in accordance with special specifications so as to be able to process a great amount of data have been so far adopted, while reducing the load applied to hardware by compressing data in order to reduce the amount of data to be processed.

In the case where the conventional method is adopted, however, there exist problems in that it is unavoidable that the overall system configuration of the data processing system is large in size, complicated, and costly.

To solve these problems, it may be considered that image information can be processed by the use of personal computers, mini-computers, office computers, etc. which are all available as versatile units. However, since these versatile units are not configured so as to process a great amount of data; since the processing speed is slow; and since these units have no processing capability to execute various tasks independently, it is impossible to process a great amount of data in a short time if the functions of these units are utilized simply as they are.

SUMMARY OF THE INVENTION

With these problems in mind, therefore, it is the primary object of the present invention to provide a data processing system for processing image information at a practical and sufficiently high data execution and processing speed by arranging a number of devices such as versatile microprocessors, memory units, etc. of low processing speed and low processing capability which are all connected to each other through a system bus and by providing arbitration functions such that each device can process data in simultaneous parallel fashion.

To achieve the above-mentioned object, the data processing system according to the present invention, which includes data input means for inputting data, display means for displaying inputted data and processed data, storage means for storing the input data and the processed data, and shared storage means connected to each of the above means through a system bus, said system executing data processing designated by the data input means, comprises, in particular, (a) a plurality of processor means provided for the data input means, the display means and the data storage means, respectively, for executing data processing, separately; (b) a plurality of memory bank means connected to the system bus, respectively, and constituting the shared storage means; (c) arbitrating means for generating an enable signal to acknowledge an occupation of one of said designated memory bank means, respectively, in response to each memory request from any of said processor means indicative that data should be transferred through the system bus to a designated one of said memory bank means; and (d) data dividing means for dividing data transferred between said processor means and memory bank means into a predetermined divisional data and for processing said divisional data with respect to a plurality of simultaneously outputted memory requests in synchronization with a bus clock in the system bus and in simultaneous parallel fashion for each divisional data when a plurality of memory requests are outputted simultaneously from a plurality of said processor means.

In the data processing system according to the present invention, said data dividing means further comprises means for allocating each time slot so formed so as to synchronize with the bus clock in the system bus to a plurality of said memory bank means, respectively and for transferring a unit of processed data constituting the divisional data through the system bus at the timing of the time slot allocated to the memory bank means designated by the memory request.

Further, said data dividing means comprises second means for transferring a unit of processed data for said memory bank means other than that designated by the memory request through the system bus at the timing of the allocated time slot corresponding to one memory bank means not designated by the memory request.

Further, said data dividing means comprises third means for forming a time slot allocated to no memory bank means in addition to the time slots allocated to a plurality of said memory bank means and for transferring a unit of processed data for the memory bank means designated by the memory request through the system bus at timing of the non-allocated time slot.

Furthermore, said data dividing means comprises fourth means for transferring data corresponding to the memory request to the memory bank at the timing of the time slot next to an empty time slot, when an empty time slot not designated by the memory request is produced in a series of time slots.

In the data processing system, the time slot is selected to have a time duration shorter than a memory cycle required when the memory bank means writes or reads data or the time duration is selected to be shorter than the data processing time required when said processor processes the data read through the system bus.

The data processing system according to the present invention further comprises arbitrating means for selecting one of simultaneously outputted memory requests in accordance with a priority order previously determined with respect to each processor means and for processing data corresponding to the memory request selected on the basis of priority, when a plurality of memory requests are outputted simultaneously from two or more processor means to the same memory bank. Said arbitrating means comprises a lock function such that a selection of other memory requests are refused until data corresponding to one of the priority-selected memory requests have been processed by a predetermined amount.

In summary, the data processing system divides data to be processed respectively in response to a memory request outputted from each processor into a predetermined amount of divisional data and executes the data processing corresponding to each memory request being classified according to the divisional data in synchronization with the clock of the system bus in simultaneous parallel fashion.

Therefore, when memory requests for each processor are generated in sequence, all the data corresponding to each memory request can be processed for each divisional data without processing all the data simultaneously; that is, the divisional data are processed in sequence simultaneously in parallel fashion, so that it is possible to markedly reduce the processing time on the whole, because almost all parts of the data processing corresponding to all the memory requests can be processed within a short time during which the divisional data corresponding to a plurality of simultaneously outputted memory requests are executed simultaneously.

Therefore, even if versatile devices of small throughput are used as the processors and memory banks, it is possible to execute the processing of all the data at a practical and sufficiently high data execution processing speed. In other words, in processing the data, including non-coded data such as image data, it is possible to readily configure a data processing system having the same degree of throughput as in a specially ordered computer by simply adopting several versatile devices.

BRIEF DESCRIPTION OF THE DRAWINGS

The features and advantages of the data processing system according to the present invention will be more clearly appreciated from the following description of the preferred embodiments of the invention taken in conjunction with the accompanying drawings in which like reference numerals designate the same or similar elements or sections throughout the figure thereof and in which:

FIG. 10 is a table for assistance in explaining the priority order of each processor;

FIG. 11 is a schematic block diagram showing a detailed configuration of the memory bank enable signal generator shown in FIG. 4;

DETAILED DESCRIPTION OF THE PREFERRED EMBODIMENTS

An embodiment of the present invention will be described in further detail with reference to the attached drawings.

Figure 1:
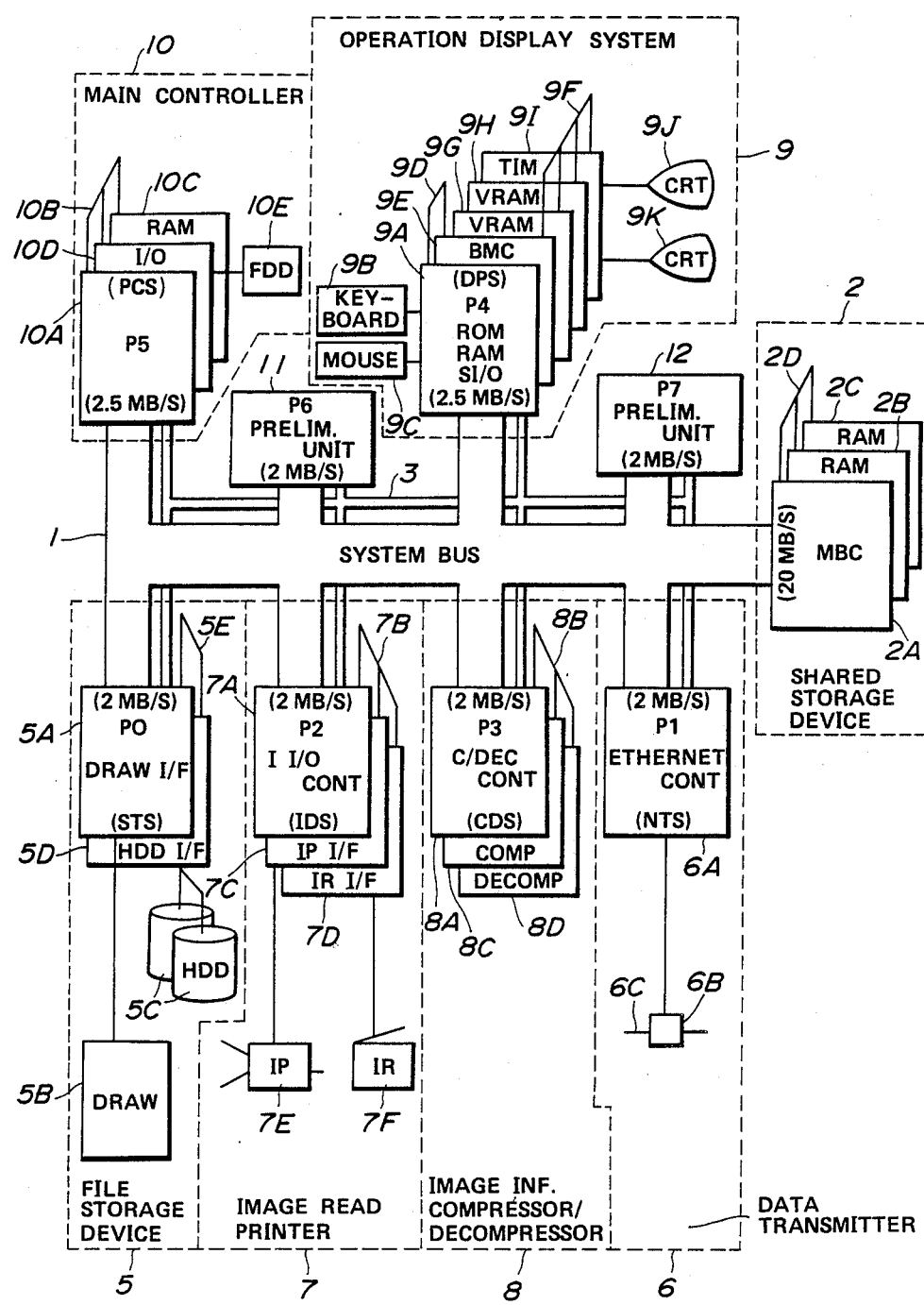
FIG. 1 is a schematic block diagram showing the general system configuration of the data processing system according to the present invention.

As shown in FIG. 1 the data processing system comprises a system bus 1 connected to eight subsystems 10, 11, 9, 12, 6, 8, 7, 5, for sharing the task of a series of data processing steps to be executed in sequence. The system bus 1 is also connected to a shared storage device 2 shared by each subsystem.

The shared storage device 2 includes a board 2A on which a bus and a memory controller (MBC) are mounted and two boards 2B and 2C on each of which a RAM having a memory capacity of 2 mega bytes (referred to as MB hereinafter) is mounted. The bus and the memory controller read and write corresponding data in or from the RAMs on the boards 2B and 2C through a local bus 2D in response to memory requests outputted from each subsystem through the system bus 1. In the case that the memory requests from each subsystem are concurrent, the bus and the memory controller (MBC) arbitrate this concurrent relationship so that the data can be processed simultaneously in parallel fashion. That is, the bus and the memory controller (MBC) include a function which is responsive to all the requests of the subsystems in a short time.

The system bus 1 is connected to each subsystem's CPU, $P_0$ to $P_7$, and is shared by all the processors $P_0$ to $P_7$ for transferring signals and data between each processor (CPU) $P_0$ to $P_7$ and the bus 1 and the memory controller (MBC) in the shared storage device 2.

In a first subsystem, a file storage device (STS) 5 is allocated and a processor $P_0$ having a data processing speed of 2 MB/sec is connected to the system bus 1. Being mounted on a board 5A, the processor $P_0$ can store or read file data in or from a DRAW (direct read after write device) 5B and a HDD (hard disk device) 5C which configure a storage device for filing data in the data processor. In this embodiment, an interface (DRAW I/F) for the DRAW 5B is disposed on the board 5A. Further, a board 5D on which an interface (HDD I/F) for the HDD 5C is mounted is connected to the processor $P_0$ through a local bus 5E.

Therefore, the processor $P_0$ writes data stored in the shared storage device 2 into the HDD 5C or the DRAW 5B through the system bus 1 and transfers data stored in the HDD 5 or the DRAW 5B to the shared storage device 2 through the system bus 1.

Further, in a second subsystem, a data transfer system (NTS) 6 is allocated and a processor $P_1$ having a data processing speed of 2 MB/sec is connected to the system bus 1. The processor $P_1$ is mounted on a board 6A together with a transmission controller (Ethernet controller) and can send out data from the system bus to a transmission path 6C of a coaxial cable through a transmission unit 6B and can receive data coming through a transmission path 6C to the system bus 1.

Therefore, the processor $P_1$ sends out data stored in the shared storage device 2 to the transmission unit 6B through the system bus 1 and receives data coming from the outside via the transmission unit 6B in the shared storage device 2 through the system bus 1. As a result, it is possible to configure a further larger scale data processor system by connecting this data processor to outside devices or units.

In a third subsystem, an image reader and printer (IDS) 7 is allocated and a processor $P_2$ having a data processing speed of 2 MB/sec is connected to the system bus 1. The processor $P_2$ is mounted on a board 7A together with an image input/output controller. Under the control of this image input/output controller, the processor $P_2$ is connected to an image printer (IP) 7E through a local bus 7B and an image printer interface (IP I/F) board 7C and further connected to an image reader (IR) 7F through the local bus 7B and an image printer interface (IR I/F) board 7D. The processor $P_2$ sends image data read through the image reader 7F in the shared storage device 2 through the system bus 1 and prints out data in the shared storage device 2 in an image printer 7E through the system bus 1.

In a fourth subsystem, an image information compressor/decompressor system (CDS) 8 is allocated, and a processor $P_3$ having a data processing speed of 2 MB/sec is connected to the system bus 1. The processor $P_3$ is mounted on a board 8A together with a compress/decompress controller, and reads data in the shared storage device 2 through the system bus 1, transfers this data to a compress processing circuit (COMP) board 8C or to a decompress processing circuit (DECOMP) board 8D through a local bus 8B, and further sends this compressed or decompressed, processed data to the shared storage device 2 through the system bus 1. The image information compressing/decompressing system 8 increases the amount of data to be stored by previously compress-processing data to be stored in the HDD 5C or DRAW 5B of the file storage device 5 in accordance with a modified Huffman method or a modified READ method and by decompress-processing the compressed data read from the HDD 5C or the DRAW 5B, the compressed or decompressed data being processed for transmission, display, printing, etc.

In a fifth subsystem, an operation display system (DPS) 9 is allocated and a processor $P_4$ having a data processing speed of 2.5 MB/sec is connected to the system bus 1. On the board 9A, on which a processor $P_4$ is mounted, there are mounted ROMs and RAMs for storing processing programs and data used in converting image data read by the processor $P_4$ into image display signals.

Further, an operation display system 9 has operating input means such as a keyboard 9B and a mouse 9C. Data from the keyboard 9B and the mouse 9C are inputted to or outputted from the processor $P_4$ through a serial input/output circuit (S I/O) mounted on the board 9A.

Here, data inputted through the keyboard 9B and the mouse 9C are those coded into predetermined formats, and the processor $P_4$ transfers these input data (e.g. character data or command data composed of characters, symbols, etc.) to the shared storage device 2 through the system bus 1.

In contrast with this, in the case where image data (such as images, characters or data indicative of a combination of images and characters) are displayed, the processor $P_4$ gives these data to a bit map controller BMC on a board 9E as commands and data through a local bus 9D. Here, the processor $P_4$ transfers only the coded character data to the bit map controller (BMC) as commands to convert them into font data corresponding thereto, and then transfers them to two boards 9G and 9H of video memory (VRAM) through a local bus 9F in order to develop them on a two-dimensional picture memory.

On the other hand, since image data generated by an image reader 7F are uncoded data which directly represent black and white picture elements as they actually are, the processor $P_4$ develops these data without converting them in the method as executed for coded character data.

Image data thus developed on the VRAM are read through a local bus 9F by a timing circuit (TIM) mounted on a board 9I and then displayed on displays 9J or 9K such as a cathode ray tube (CRT), for instance.

In addition to the above-mentioned functions, the processor $P_4$ reads image data from the shared storage device 2 through the system bus 1 and assembles or edits these into a piece of a picture. Further, the processor $P_4$ has a function for inserting characters inputted from the keyboard 9B into the picture. The processor $P_4$ displays data being processed in the above assembly edition process on the CRTs 9J and 9K and transfers the assembled edited data to the shared storage device 2 through the system bus 1.

As described above, the operation display unit 9 assembles and edits a piece of a picture on the basis of image data read from the file storage device 5 to the shared storage unit 2 and in response to the operations of the keyboard 9B and the mouse 9C serving as operation input means and displays the picture on the display units 9J and 9K. Further, the edited picture data are transferred to the shared storage unit 2 through the system bus 1. These data are stored in the file storage device 5, printed by an image printer 7E provided in an image read printer 7 or transferred to the outside through a data transmitter 6B.

In a sixth subsystem, a main controller system (PCS) 10 is allocated and a processor $P_5$ having a data processing speed of 2.5 MB/sec is connected to the system bus 1. To a board 10A on which the processor $P_5$ is mounted, a RAM on a board 10C and an input unit I/O on a board 10D are connected through a local bus 10B. Each subsystem and the shared storage device 2 connected to the system bus 1 are controlled as a whole in accordance with a system operation program (operating system, application program, etc.) written from a floppy disk drive (FDD) in the local memory RAM through the input/output device I/O. Interrupt signals and attention signals required for the above-mentioned control are transferred between the main controller 10 and the total subsystems through a control signal line 3.

Further, the processor $P_5$ executes the assembly processing of image data to be printed by the image printer 7E in accordance with a program inputted to the RAM on the board 10C.

Seventh and eighth subsystems, preliminary units 11 and 12 (their processors are designated by $P_6$ and $P_7$), have bus space allocated for them so as to allow other new possible functions to be added.

In the system configuration as shown in FIG. 1, the operator can enter commands for designating modes and character data such as characters and symbols by the use of the keyboard 9B and the mouse 9C in the operation display system 9 and further image data including pictures and characters by the use of the image reader 7F of the image read printer 7. Here, data inputted from the keyboard 9B and the mouse 9C are those having predetermined codes so as to be easily transferred and processed, so that the character data can be inputted in dependence upon a relatively small amount of data. In contrast with this, image data inputted from the image reader 7 of the image read printer 9 are extraordinally great in the amount of data, because the image data represents the black or white of each picture element on the basis of binary code.

The data inputted through the keyboard 9B or the mouse 9C are written once from the processor $P_4$ of the operation display system 9 to the shared storage device 2 through the system bus 1 and thereafter transferred to the image compressor/decompressor system 8 again through the system bus 1 in order to execute data compression processing. The data thus processed are transferred to the shared storage device 2 again through the system bus 1. Thereafter, the data are transferred to the file storage device 5 again through the system bus 1 and are stored in the HDD 5C or the DRAW 5B serving as the external storage device.

Similarly, image data inputted from the image read printer 7 are once stored in the shared storage device 2 through the system bus 1, and then transferred to the image information compressor/decompressor system 8, again through the system bus 1, for data compression. The compressed data are transferred to the shared storage device 2 through the system bus 1 and then transferred to the file storage device 5 through the system bus 1 so as to be stored in the HDD 5C or the DRAW 5B.

As described above, data compressed by the image information compressor/decompressor system 8 are stored in the HDD 5C and the DRAW 5B, and these stored data are outputted to the display units 9J and 9K in the operation display unit 9 or the image printer 7E in the image read printer 7. In this case, data in the HDD 5C and the DRAW 5B are transferred to the shared storage device 2 through the system bus 1 on the basis of the data from the keyboard 9B or the mouse 9C in the operation display system 9, and then transferred to the image information compressor/decompressor system 8 through the system bus 1 in order to decompress the transferred data. The resultant data are transferred to the shared storage device 2 through the system bus 1 and then displayed or printed by the display units 9J and 9K in the operation display system 9 or by the image printer 7E in the image read/printer 7. At this moment, the assembly of the picture with respect to image signals supplied to the display units 9J and 9K is executed by the processor $P_4$ in the operation display system 9, while the assembly of a picture with respect to image signals supplied to the printer 7E is executed by the processor $P_5$ in the main controller 10.

Further, in a mode wherein the data stored in the file storage device 5 are re-edited or that characters are newly inserted in a picture inputted through the keyboard 9B or the image reader 7F, after having once been transferred to the shared storage device 2, the respective data are edited by the processor $P_4$ in the same way.

As described above, the data processor shown in FIG. 1 processes data under the control of the main controller 10 in each operation mode in accordance with an operation program (that is, operating system or application program) inputted from the floppy disk drive FDD to the local memory RAM on the board 10C in the main controller 10. In executing the above data processing, each subsystem accesses the shared storage device 2 while sharing the system bus 1. When this happens, it is necessary to occupy the shared storage device 2 and the subsystems until data processing has been completed in response to a corresponding memory request outputted from one subsystem. By the term "occupy" or "occupation" is meant that the "occupying" device obtains command, i.e. monopolizes, the shared device or subsystem which is then considered "occupied." However, if the above occupation time is excessively long, it would be necessary in a prior art system to wait for a long time in order to process data on the basis of another memory request outputted from another subsystem. In order to solve the above problem, the shared storage device 2 is so configured as to have an arbitration function such that the bus and the memory controller (MBC) can process the supply of data from each processor in each subsystem simultaneously in parallel fashion. Therefore, it is possible to markedly reduce data processing time as compared when a series of sequential data are processed in time-series fashion, as described below.

Further, signals and data having a bar code are represented on the basis of negative logic.

Figure 2:
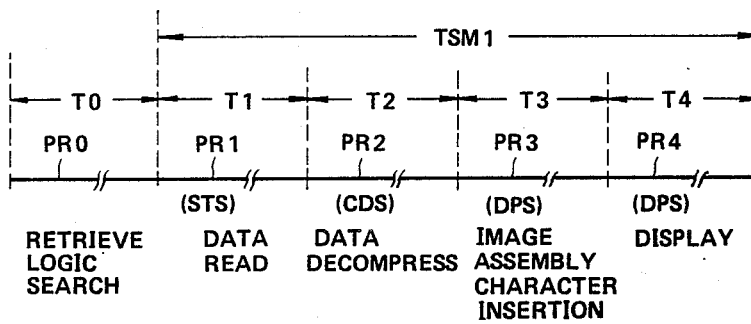
FIG. 2 is a diagram showing a series of data processing steps to be processed by the system shown in FIG. 1.

Now, for example, in the case where (compressed) image data which has been stored in the HDD 5C and the DRAW 5 in the file storage device, serving as an external storage device, are retrieved and displayed on the display units 9J and 9K in the operation display device 9, a series of data as shown in FIG. 2 are processed in sequence.

That is, at the data processing step PR0 of No. 0, under the control of the main controller 10, image data to be read out from the HDD 5C or the DRAW 5B in the file storage device 5 are retrieved logically.

At the succeeding data processing step PR1 of No. 1, the data retrieved from the file storage device 5 are read out and transferred to the shared storage device 2. At the succeeding data processing step PR2 of No. 2, the data transferred to the shared storage device 2 are read out by the processor $P_3$ in the image information compressor/decompressor system 8 for decompression processing and then written again in the shared storage device 2. At the succeeding data processing step PR3 of No. 3, the data written again into the shared storage device 2 are read out by the processor $P_4$ in the operation display system 9 for the edition/assembly processing of a picture and for the insertion processing of characters and then stored again in the shared storage device 2. At the succeeding data processing step PR4 of No. 4, the data stored again in the shared storage device 2 are read by the operation display system 9 and then displayed on the display units 9J and 9K through the bit map controller 9E and the VRAMs 9G and 9H.

In a series of these data processing steps, the steps in which the data are transferred through the system bus 1 are the data processing steps $PR_1$ to $PR_4$ of No. 1 to No. 4, the sum total of each processing time $T_1$ to $T_4$ being determined according to the data processing speed of each processor for processing data in each step and to the amount of data to be processed in each processor.

That is to say, in the data processing step $PR_1$, the data read out from the HDD 5C or the DRAW 5B in the file storage device 5 are transferred to the shared storage device 2 during time $T_1$ at the data processing speed 2 MB/sec of the processor $P_0$. In the data processing step $PR_2$ of No. 2, the processor $P_3$ in the image information compressor/decompressor system 8 reads the data stored in the shared storage device 2 at the data processing speed 2 MB/sec, and further the processor $P_3$ stores again the decompression processed data into the shared storage device 2 at the data processing speed of 2 MB/sec, thus a data processing time $T_2$ being required. Also, in the data processing step $PR_3$ of No. 3, the processor $P_4$ in the operation display system 9 reads out the data from the shared storage device 2 at the data processing speed of 2.5 MB/sec, and then executes the edition processing such as picture assembly or character insertion, etc. Thereafter, the processor $P_4$ stores the edited data in the shared stored device 2 at the data processing speed 2.5 MB/sec thus a data processing time $T_3$ being required. Further, at the data processing step $PR_4$ of No. 4. the processor $P_4$ in the operation display unit 9 reads out the data from the shared storage device 2 at the data processing speed of 2.5 MB/sec and displays the read data on the display units 9J and 9K, thus a data processing time $T_4$ being required.

Therefore, in the data processing system configured as shown in FIG. 1, if a series of data processing steps as shown in FIG. 2 are executed in sequence in time-series fashion, the sum total TSM 1 of times required for processing and storing data over the system bus, is as follows:

$$TSM\ 1 = T_1 + T_2 + T_3 + T_4 \qquad (1)$$

According to the theory of the present invention, however, the task of processing and storing the amount of data thus explained over the system bus is divided into predetermined divisional data (for instance, about 16 kB or 8 kB (kB: kilobyte)) and the data processing is executed one divisional data by one divisional data simultaneously in parallel fashion by the use of a plurality of processors.

Figure 3:
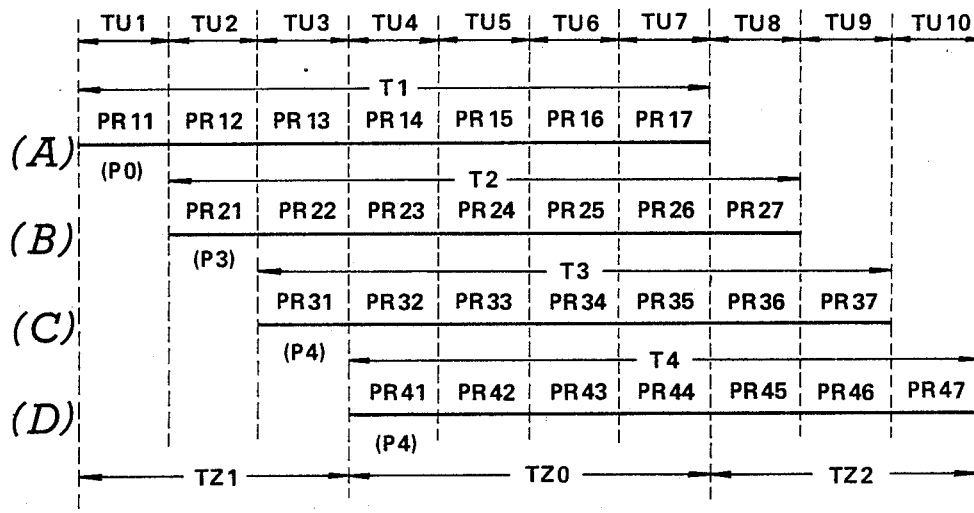
FIG. 3 is a similar diagram showing several series of data processing steps to be processed in simultaneous parallel processing fashion.

In more detail, the data to be processed in a series of data processing steps $PR_1$ to $PR_4$, respectively, as shown in FIG. 2 are divided into a plurality of divisions (seven divisions in this embodiment) as shown in FIG. 3, and the processing of each divisional data are executed in sequence simultaneously in parallel fashion for each divisional data processing execution time $TU_1$ to $TU_{10}$.

In FIG. 3(A), the data corresponding to one sector or one track are read from the file storage device 5 by the processor $P_0$ as a first divisional data to be processed, corresponding to the data processing step $PR_1$ in FIG. 2, and are transferred to the shared storage device 2, all during the processing step $PR_{11}$ of processing execution time $TU_1$. This first divisional data as shown in FIG. 3(B) is next processed in the processing step $PR_{21}$ during the succeeding processing execution time $TU_2$, corresponding to the data processing step $PR_2$ shown in FIG. 2. That is, the data are read from the shared storage device 2 by the processor $P_3$ in the image information compressor/decompressor system 8 for decompression processing, and are then stored again in the shared storage device 2.

This first re-stored divisional data, as shown in FIG. 3(C), is next processed in the processing step $PR_{31}$ during the processing execution time $TU_3$, corresponding to the data processing step $PR_3$ shown in FIG. 2. That is, the processor $P_4$ reads the divisional data in the shared storage device 2 for edition processing and thereafter the data is re-stored in the shared storage device 2. This first re-stored divisional data, as shown in FIG. 3(D), is thereafter processed in the data processing step $PR_{41}$ during the processing execution time $TU_4$, corresponding to the data processing step $PR_4$ shown in FIG. 2. The first divisional data in the shared storage device 2 are thus read out by the processor $P_4$ and displayed on the display units 9J and 9K.

As described above, the first divisional data is processed sequentially in the order of the data processing steps $PR_{11}$, $PR_{21}$, $PR_{31}$, and $PR_{41}$ during the processing execution times $TU_1$, $TU_2$, $TU_3$, and $TU_4$, respectively.

After the elapse of time $TU_1$, in the second processing execution time $TU_2$ the processor $P_0$ in the file storage device 5 reads the second divisional data from the external storage device in the data processing step $PR_{12}$ and stores it in the shared storage device 2. In the same way as in the first divisional data, this second divisional data is sequentially processed in the data processing steps $PR_{22}$, $PR_{32}$, and $PR_{42}$ which are time shifted in sequence with respect to the processing execution times $TU_3$, $TU_4$ and $TU_5$; as a result, the second divisional data are displayed on the display units 9J and 9K during the processing execution time $TU_5$.

In the same way, the third, fourth, . . . , etc. divisional data are read from the file storage device 5 in sequence during the processing execution times $TU_3$, $TU_4$ . . . , etc. and are processed and displayed on the display units 9J and 9K in sequence in the processing steps ($PR_{23}$, $PR_{33}$, $PR_{43}$), ($PR_{24}$, $PR_{34}$, $PR_{44}$), . . . , etc. as these third, fourth . . . , etc. divisional data are shifted in sequence to the succeeding processing execution times ($TU_4$, $TU_5$, $TU_6$), ($TU_5$, $TU_6$, $TU_7$) . . . , etc.

As described above, the data to be processed in the data processing steps $PR_1$, $PR_2$, $PR_3$ and $PR_4$ shown in FIG. 2 are processed in sequence one divisional data by one divisional data for each succeeding divisional data processing execution time, and further the sequential processings are executed in concurrent parallel fashion (referred to hereafter as pipe line processing). As a result, each processor to which each task in each processing step is allocated operates in concurrent parallel fashion in the divisional data processing execution time. Therefore, it is possible to enhance the processing capability as a whole when a plurality of processors is seen as a single processor, thus the total data processing time being shortened.

The reason why the above-mentioned good results can be obtained is that: in the case where the data processing steps $PR_1$ to $PR_4$ are executed in sequence in time-series fashion as shown above in FIG. 2, while one processor to which a task for one data processing step is allocated is operating for data processing, other processors are in a stand-by condition only awaiting commands without processing data, and therefore the data processing time is elongated because of the existence of such wasteful time. However, according to the method shown in FIG. 3, it is possible to markedly reduce the above-mentioned wasteful time.

When the data processing method according to the present invention as shown in FIG. 3 is executed, the total processing time $TSM_2$ required for processing the total data is an addition of a time interval $TZ_0$ during which the data processing steps executed by all the processors $P_0$ to $P_4$ are overlapped with each other and time intervals $TZ_1$ and $TZ_2$ during which the above steps are not overlapped on both the sides of the time $TZ_0$. Therefore, when the tasks for each processor are allocated so that the above non-overlapped time may become short, it is possible to further shorten the total data processing time markedly as compared with the case shown in FIG. 2.

For instance, as shown in FIGS. 3(A) to 3(D), when each divisional data processing execution time in each processing step is determined so as to be equal to each other, the total data processing time $TSM_2$ can be expressed as $$TSM\,2 = [K + (DSP - 1)] \times TU \qquad (2)$$

where K denotes the number of divisional data in each divisional data processing step, DSP denotes the number of programs executed simultaneously (the number of processing steps $PR_1$ to $PR_4$ in FIG. 2), and TU denotes the divisional data processing execution time, respectively.

Therefore, in the system configuration as shown in FIG. 1, even if versatile microprocessors of relatively slow processor speed are incorporated, it is possible to realize a data processor provided with a operationally sufficient throughput suitable for processing the markedly great amount of image data from the standpoint of the total data processing time.

Further, the concurrent parallel processings of divisional data in the system configuration shown in FIG. 1 can be achieved when the arbitrator provided for the bus and the memory controller (MBC) in the shared storage device 2 processes the concurrence of processors in the subsystems connected to the system bus 1 in concurrent parallel fashion.

Shared Storage Device

Figure 4A:
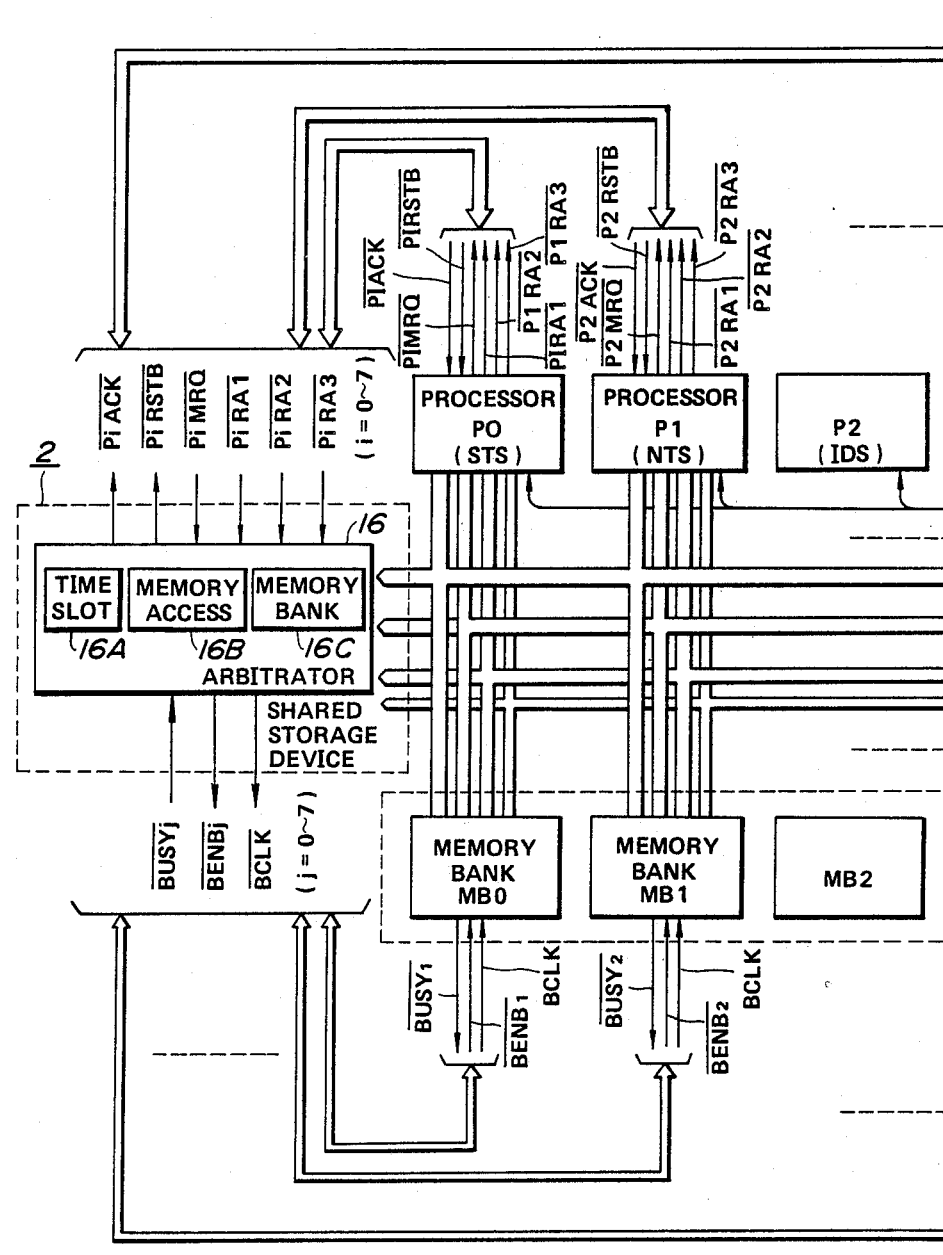
FIGS. 4A and 4B are a schematic block diagram showing a configuration section related to the bus system shown in FIG. 1.
Figure 4B:
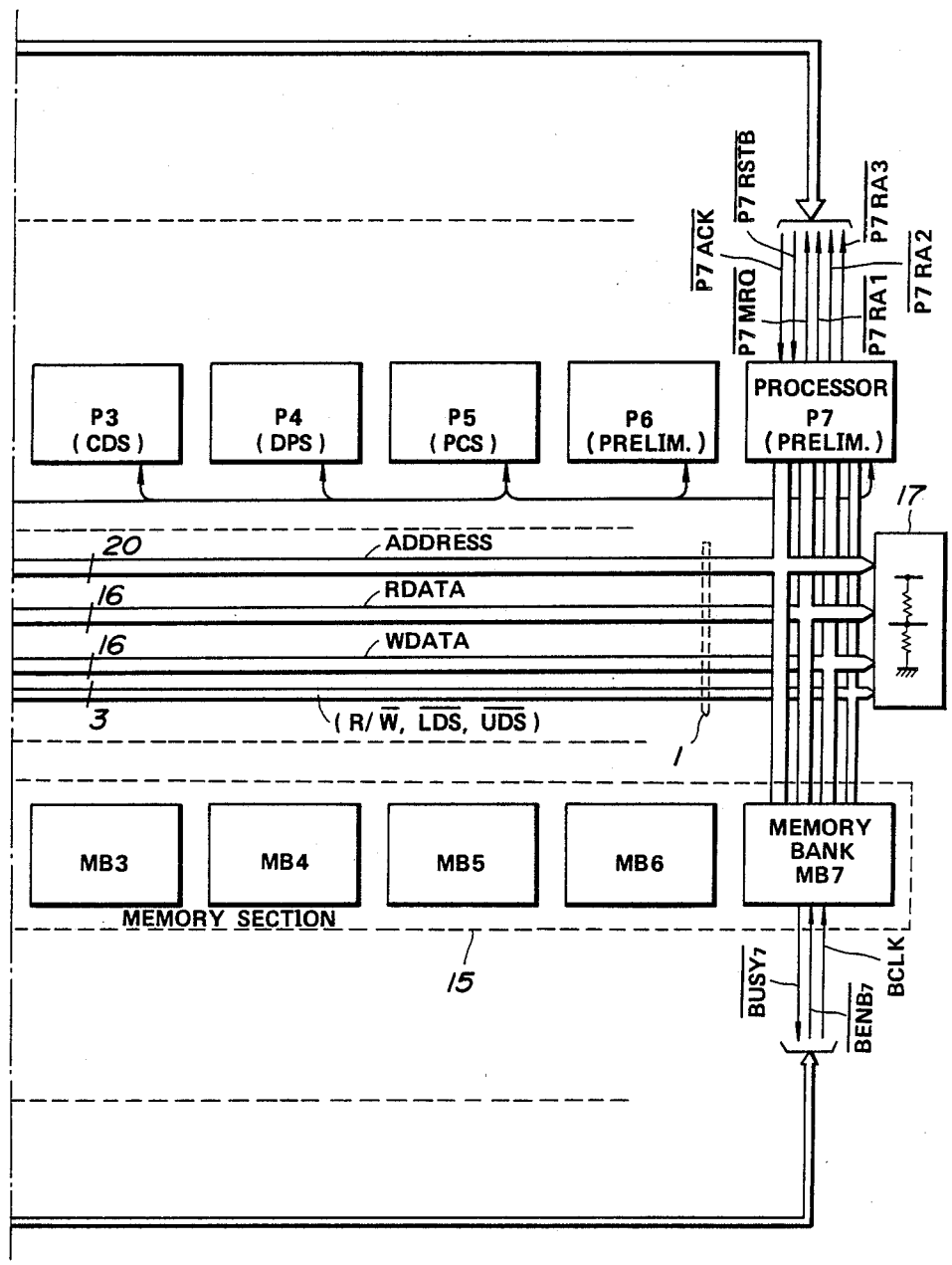

As shown in FIG. 4, the shared storage device 2 is connected to each processor $P_0$, $P_1$, $P_2$ ... $P_7$ (referred to as $P_i$, i=0, 1, 2 ... 7) in the six subsystems 5 to 10 and two preliminary units 11 and 12 through the system bus 1. The system bus 1 is designed so as to be exclusively used for a processor of a subsystem by controlling the system bus 1 and the memory unit 15 made up of the RAMs 2B and 2C (FIG. 1) in dependence upon the arbitrator 16.

In this embodiment, the system bus 1 is composed of an address data line ADDRESS of 20 bits, a read data line RDATA of 16 bits, a write data line WDATA of 16 bits, and a bus of bits 3 for transferring a read-write command R/$\overline{\text{W}}$ and high-order bite to low order bite selection signals $\overline{\text{LDS}}$ and $\overline{\text{UDS}}$, the system bus 1 being terminated at the terminal 17.

The memory 15 is divided into eight memory banks $MB_0$, $MB_1$ ... $MB_1$ (referred to as $MB_j$, j=0, 1, 2 ... 7) having a memory capacity of 250 kilowords. Each system bus 1 is connected to each memory bank $MB_0$ to $MB_7$ so that each processor $P_0$ to $P_7$ can access each memory bank separately. In the configuration as described above, while one memory bank is operating to read/write data (referred to as a memory cycle), the other memory banks can be accessed. The system bus 1 is connected to the arbitrator 16. When mutually concurrent memory requests are outputted from the processors $P_0$ to $P_7$ in the eight subsystems to the memory section 15 through the system bus 1, the system configuration shown in FIGS. 5 to 7 arbitrates the concurrence in order to execute the data processing in concurrent parallel fashion in response to all of the memory requests. Here, the contents of the memory requests sent out from each processor are either the writing of data in the shared storage device 2 or the reading of data stored in the shared storage device 2.

The arbitrator 16 executes two arbitration tasks. The first task is to allocate memory banks $MB_j$ (j=0, 1, 2 ... 7) to which an occupation is acknowledged in response to the memory request when plural memory requests are outputted simultaneously from the eight processors $P_i$ (i=0, 1, 2 ... 7) to each memory section 15.

The second task of the arbitrator 16 is to arbitrate which processor $P_i$ should be acknowledged to be occupied when the same memory request is outputted from plural processors $P_i$ to the same memory bank $MB_j$.

The arbitrator 16 has a time slot allocator 16A (FIG. 5) for executing the first task. As shown in FIGS. 6(A) to (H), this time slot allocator 16A generates eight time slot signals $TS_0$ to $TS_7$ (referred to as $TS_j$, j=1, 2 ... 7) corresponding to the memory banks $MB_0$ to $MB_7$ in sequence circulatively, and the fall time intervals (referred to as the time slot intervals) of each time slot signal $TS_0$ to $TS_7$ are allocated in sequence to the processors $P_0$ to $P_7$ in the subsystems.

Here, the time slot intervals of each time slot signal $TS_0$ to $TS_7$ are selected to correspond to the processing time for a unit of data (for instance, 1 word) which are actually and sequentially processed. Therefore, the repetitive period of each time slot is determined to be sufficiently short as compared with the processing execution times $TU_1$ to $TU_{10}$ (FIG. 3) required for processing the divisional data. As described above, in practice, the divisional data are processed unit data by unit data.

Thus, in the case where memory requests $\overline{RQ_0}$, $\overline{RQ_1}$, $\overline{RQ_2}$ ... $\overline{RQ_7}$ (referred to as $\overline{RQ_j}$, j=0, 1, 2, ... 7) are outputted from each corresponding processor $P_0$, $P_1$, $P_2$, ... $P_7$ during the time slot intervals of the time slot signals $TS_0$, $TS_1$, ... $TS_7$, enable signals $\overline{EN_0}$, $\overline{EN_1}$, $\overline{EN_2}$ ... $\overline{EN_7}$ (referred to as $\overline{EN_j}$, j=0, 1, 2, ... 7) are generated, respectively, which indicate that each processor $P_0$, $P_1$, $P_2$ ... $P_7$, respectively, of each subsystem outputting a memory request is acknowledged to occupy the memory banks $MB_1$, $MB_2$ ... $MB_7$ through the system bus 1 during the corresponding time slot interval. Here, when the memory requests of each processor $P_0$ to $P_7$ do not concur, the arbitrator 16 has the capability (referred to as time slot allocation function) of processing the memory request by unconditionally using the time slot corresponding to the memory bank when a memory request to one of the memory banks $MB_0$ to $MB_7$ is outputted.

Additionally, when no corresponding memory request is generated in each time slot of the time slot signal $TS_j$ (j=0, 1, ... 7), the arbitrator 16 has the capability (referred to as time slot utilization function) of utilizing the time slots having no corresponding memory requests in order to process the memory requests to the memory banks allocated to the other time slots.

The above relationship can be expressed as follows:

$$\sum_{j=0}^{7} TS_j = 1 \quad (3)$$

$$EN_j = TS_j + RQ_{j-1} \cdot EN_{j-1} \quad (4)$$

where $TS_j$ denotes the time slot signal allocated to the j-th memory bank $MB_j$ (j=0, 1, ... 7); $\overline{RQ_j}$ denotes the j-th request signal to the memory bank $MB_j$; and $EN_j$ denotes an enable signal indicative of acknowledgement of the j-th memory bank $MB_j$ to be occupied.

Here, the formula (3) indicates that the time slot signal $TS_j$ (j=0 to 7) generates continuously the time slots in sequence circulatively. In contrast with this, the formula (4) indicates that the enable signal $EN_j$ to the j-th memory bank $MB_j$ is generated at the timing of the time slot of the time slot signal $TS_j$ allocated to the corresponding j-th memory bank $MB_j$ (the first term $TS_j$) and that the request signal $RQ_{j-1}$ is not generated at the time slot corresponding to the (j−1)-th memory bank MB(j−1) and further the memory bank MB(j−1) corresponding to the corresponding time slot is at the no-use timing (the second term $RQ_{j-1} \cdot EN_{j-1}$). As described above, the memory request is outputted to the j-th memory bank $MB_j$. When no memory request is outputted to the memory bank MB(j−1) corresponding to the (j−1)-th time slot, the request to the j-th memory bank $MB_j$ can be processed by the preceding time slot.

This indicates that when there are no memory requests to the preceding time slots (that is; the (j−2)-th, (j−3)-th), the j-th memory bank $MB_j$ can be accessed by the use of the time slots allocated to the (j−2)th, (j−3)th ... memory banks MB(j−2), MB(j−3) ... (referred to as previous dependence effect).

The above relationship of formula (4) can be expressed as enable signals $EN_1$ to $EN_7$ to each memory bank $MB_0$ to $MB_7$ as follows:

$$EN_1 = TS_1 + RQ_0 \cdot EN_0 \quad (5)$$

$$\begin{aligned} EN_2 &= TS_2 + RQ_1 \cdot EN_1 \\ &= TS_2 + RQ_1 \cdot TS_1 + RQ_1 \cdot RQ_0 \cdot EN_0 \end{aligned} \quad (6)$$

$$\begin{aligned} EN_3 &= TS_3 + RQ_2 \cdot EN_2 \\ &= TS_3 + RQ_2 \cdot TS_2 + RQ_2 \cdot RQ_1 \cdot TS_1 \\ &+ RQ_2 \cdot RQ_1 \cdot RQ_0 \cdot EN_0 \end{aligned} \quad (7)$$

$$\begin{aligned} EN_4 &= TS_4 + RQ_3 \cdot EN_3 \\ &= TS_4 + RQ_3 \cdot TS_3 + RQ_3 \cdot RQ_2 \cdot TS_2 \\ &+ RQ_3 \cdot RQ_2 \cdot RQ_1 \cdot TS_1 + RQ_3 \cdot RQ_2 \\ &\cdot RQ_1 \cdot RQ_0 \cdot EN_0 \end{aligned} \quad (8)$$

$$\begin{aligned} EN_5 &= TS_5 + RQ_4 \cdot EN_4 \\ &= TS_5 + RQ_4 \cdot TS_4 + RQ_4 \cdot RQ_3 \cdot TS_3 \\ &+ RQ_4 \cdot RQ_3 \cdot RQ_2 \cdot TS_2 + RQ_4 \cdot RQ_3 \\ &\cdot RQ_2 \cdot RQ_1 \cdot TS_1 + RQ_4 \cdot RQ_3 \cdot RQ_2 \\ &\cdot RQ_1 \cdot RQ_0 \cdot EN_0 \end{aligned} \quad (9)$$

$$\begin{aligned} EN_6 &= TS_6 + RQ_5 \cdot EN_5 \\ &= TS_6 + RQ_5 \cdot TS_5 + RQ_5 \cdot RQ_4 \cdot TS_4 \\ &+ RQ_5 \cdot RQ_4 \cdot RQ_3 \cdot TS_3 + RQ_5 \cdot RQ_4 \\ &\cdot RQ_3 \cdot RQ_2 \cdot TS_2 + RQ_5 \cdot RQ_4 \cdot RQ_3 \\ &\cdot RQ_2 \cdot RQ_1 \cdot TS_1 + RQ_5 \cdot RQ_4 \cdot RQ_3 \\ &\cdot RQ_2 \cdot RQ_1 \cdot RQ_0 \cdot EN_0 \end{aligned} \quad (10)$$

$$\begin{aligned} EN_7 &= TS_7 + RQ_6 \cdot EN_6 \\ &= TS_7 + RQ_6 \cdot TS_6 + RQ_6 \cdot RQ_5 \cdot TS_5 \\ &+ RQ_6 \cdot RQ_5 \cdot RQ_4 \cdot TS_4 + RQ_6 \cdot RQ_5 \\ &\cdot RQ_4 \cdot RQ_3 \cdot TS_3 + RQ_6 \cdot RQ_5 \cdot RQ_4 \\ &\cdot RQ_3 \cdot RQ_2 \cdot TS_2 + RQ_6 \cdot RQ_5 \cdot RQ_4 \\ &\cdot RQ_3 \cdot RQ_2 \cdot RQ_1 + TS_1 \cdot RQ_6 \cdot RQ_5 \\ &\cdot RQ_4 \cdot RQ_3 \cdot RQ_2 + RQ_1 \cdot RQ_0 \cdot EN_0 \end{aligned} \quad (11)$$

$$\begin{aligned} EN_0 &= TS_0 + RQ_7 \cdot EN_7 \\ &= TS_0 + RQ_7 \cdot TS_7 + RQ_7 \cdot RQ_6 \cdot TS_6 \\ &+ RQ_7 \cdot RQ_6 \cdot RQ_5 \cdot TS_5 + RQ_7 \cdot RQ_6 \\ &\cdot RQ_5 \cdot RQ_4 \cdot TS_3 + RQ_7 \cdot RQ_6 \cdot RQ_5 \\ &\cdot RQ_4 \cdot RQ_3 \cdot TS_3 + RQ_7 \cdot RQ_6 \cdot RQ_5 \\ &\cdot RQ_4 \cdot RQ_3 \cdot RQ_2 + TS_2 \cdot RQ_7 \cdot RQ_6 \\ &\cdot RQ_5 \cdot RQ_4 \cdot RQ_3 + RQ_2 \cdot RQ_1 \cdot TS_1 \\ &+ RQ_7 \cdot RQ_6 \cdot RQ_5 \cdot RQ_4 + RQ_3 \cdot RQ_2 \\ &\cdot RQ_1 \cdot RQ_0 \cdot EN_0 \end{aligned} \quad (12)$$

Figure 7:
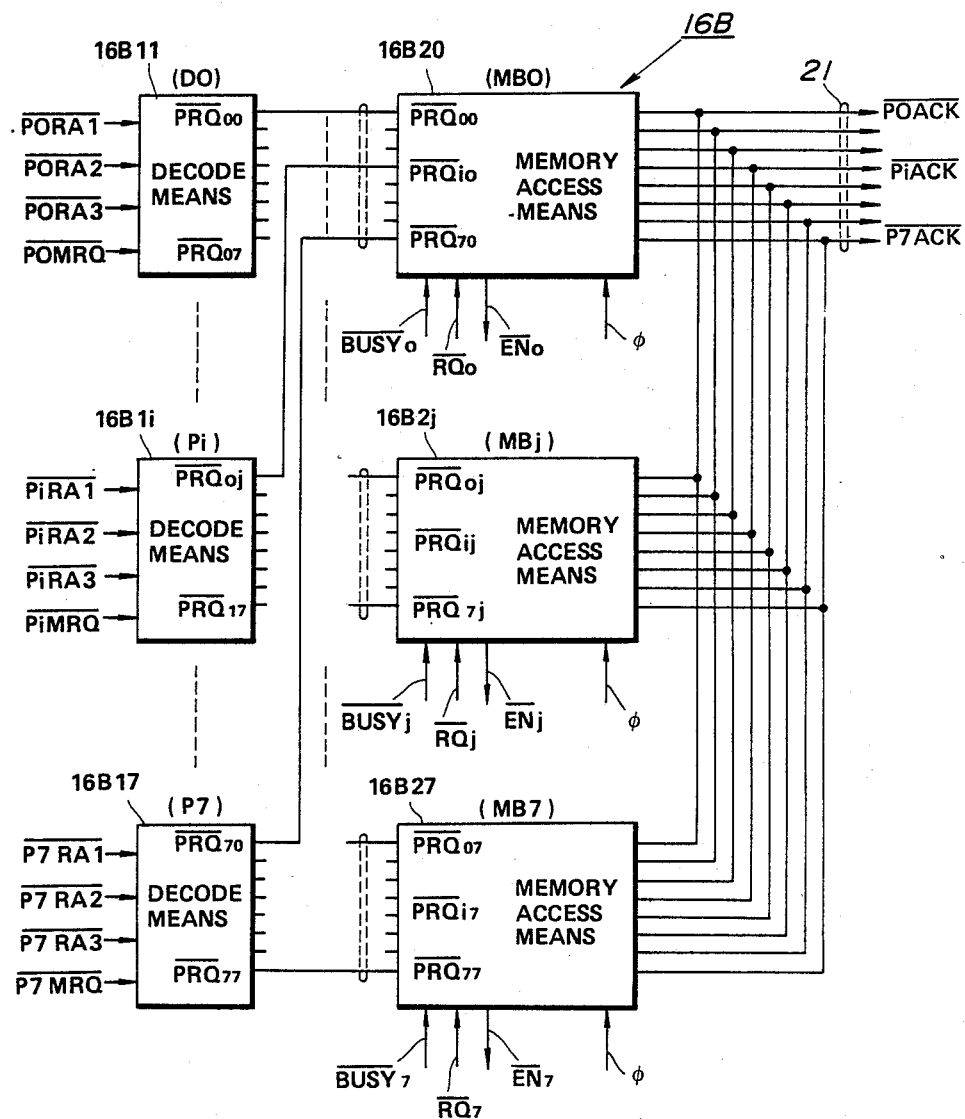
FIG. 7 is a schematic block diagram showing a detailed configuration of the memory access controller shown in FIG. 4.

In the formulas from (5) to (12), the term $EN_{j-1}$ in the second term expression $RQ_{j-1} \cdot EN_{j-1}$ can be obtained by substituting the preceding expression, and the resultant expansion expressions indicates that an enable signal $EN_j$ for acknowledging data in the j-th memory bank to be processed by the use of an empty slot when the empty slot is present in the other j-th or less time slots can be obtained, thus the previous dependence effect is obtained. The arbitrator 16 further includes a memory access controller 16B (FIG. 4). This memory access controller 16B has decode means 16B11 to 16B17 (referred to as 16B1$_i$, i=0,1, ... 7) corresponding to the processors $P_0$ to $P_7$ as shown in FIG. 7, which receive the memory request signals $\overline{P_i + MRQ}$ (i=0,1, ... 7) indicative of the fact that memory request is outputted from each processor $P_i$ (i=0,1 ... 7) and memory bank number data $\overline{P_iRA1}$, $\overline{P_iRA2}$, $\overline{P_iRA3}$ (i=0,1, ... 7) indicating the numbers of the designated memory banks as a three bit signal. Therefore, a four bit signal, indicative of the memory bank to which the memory request is outputted from the corresponding processor $P_i$, is inputted to the decode means 16 B1$_i$.

In response to this input signal, the decode means 16 B1$_i$ generates a memory bank designation signal to $\overline{PRQ_{i0}}$ to $\overline{PRQ_{i7}}$, (i=0,1, ... 7) indicative of a designated memory bank. In these memory bank designation signals $\overline{PRQ_{i0}}$ to $\overline{PRQ_{i7}}$, the subscript indicates that a memory request is outputted from the i-th processor to the 0-th to 7-th memory banks $MB_0$ to $MB_7$. These signals are distributed to memory access means 16B20 to 16B27 (referred to as 16B2$_j$, j=0,2, ... 7) provided in correspondence to the memory bank $MB_0$ to $MB_7$.

That is to say, memory bank signals $\overline{PRQ_{00}}$ to $\overline{PRQ_{70}}$ for designating the 0-th memory bank $MB_0$ are collected to the 0-th memory access means 16B20 from among the memory bank designation signals generated from the decode means 16B11 to 16B17; and so on; memory bank signals $\overline{PRQ_{07}}$ to $\overline{PRQ_{77}}$ designating the 7-th memory bank MB$_7$ are collected to the 7-th memory access means 16B2$_7$ from among the memory bank designation signals generated from the decode means 16B11 to 16B17.

To express the above in general, the memory bank designation signals $\overline{PRQ_{0j}}$ to $\overline{PRQ_{7j}}$ (referred to as $\overline{PRQ_{ij}}$, i=0,1,...7, j=0,1,...7) for designating the j-th memory bank MB$_j$ are collected to the j-th memory access means (16B2$_j$ (j=0,1,...7) from among the memory bank designation signals generated from the decode means 16B11 to 16B17.

Figure 8:
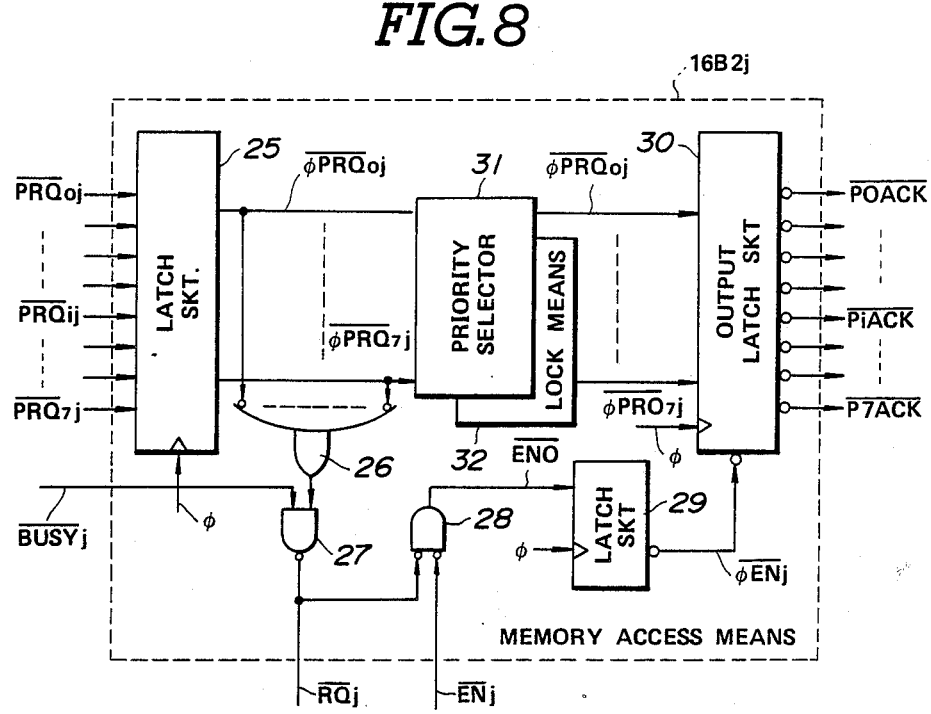
FIG. 8 is a schematic block diagram showing a further detailed configuration of the memory access means shown in FIG. 7.

As shown in FIG. 8, the memory access means 16B2$_j$ latches the memory bank designation signal $\overline{PRQ_{ij}}$ by a latch circuit 25 in dependence upon a clock signal $\phi$. This clock $\phi$ is used for acknowledging the arbitrator 16 to be operated in synchronization with the memory banks MB$_0$ to MB$_7$ and the processors P$_0$ to P$_7$, and is generated in synchronization with the bus clock BCLK.

The memory request latched by the latch circuit 25 is inputted to a two-input NAND gate 27 through a NOR gate 26. To this NAND gate 27, a busy signal $\overline{BUSY_j}$ supplied from the memory bank MB$_j$ allocated to the corresponding memory access means 16B2$_j$ is given as the second condition input. This busy signal $\overline{BUSY_j}$ is generated when the j-th memory bank MB$_j$ is not in memory cycle operation. Therefore, at the output terminal of the NAND gate 27, when a memory request is outputted from any of the processors, a request signal $\overline{RQ_j}$ can be obtained under the condition that the corresponding j-th memory bank MB$_j$ is not in memory cycle operation. This request signal $\overline{RQ_j}$ is supplied to the time slot allocator 16A as already described with reference to FIG. 5.

Therefore, although the time slot allocator 16A generates an enable signal $\overline{EN_j}$ the timing of the time slot TS$_j$ indicative of t formula (4) with respect to the request signal $\overline{RQ_j}$, this enable signal $\overline{EN_j}$ is returned to one input of a 2-input NAND gate 28 in the memory access means 16B2$_j$. To the other input of this 2-input NAND gate 28, the request signal $\overline{RQ_j}$ is inputted, so that an output enable signal $\overline{EN_0}$ is outputted at the timing of the time slot to which this request signal $\overline{RQ_j}$ is allocated after the request signal $\overline{RQ_j}$ has been generated. This output enable signal $\overline{EN_0}$ is latched by a latch circuit 29 in dependence upon the clock $\phi$ and the latch output is outputted as a latch enable signal $\phi\overline{EN_j}$ to an output latch circuit 30.

The latch output $\phi\overline{PRQ_{ij}}$ of the latch circuit 25 is given to a priority selector 31 for selecting a memory bank designation signal of the highest priority level from among a plurality of memory bank designation signals coming thereto simultaneously. The selected memory bank designation signal is then applied to the output latch circuit 30. As described above, the output latch circuit 30 latches the memory bank designation signal $\phi\overline{PRO_{ij}}$ selected by the priority selector 31, and outputs this signal as occupation acknowledgement signal $\overline{P_0ACK}$ to $\overline{P_7ACK}$, (referred to as $\overline{P_iACK}$ i=0,1, ... 7). This occupation acknowledgement signal $\overline{P_iACK}$ is a signal which acknowledges that the i-th processor P$_i$ outputting a memory request to the corresponding j-th memory bank MB$_j$ can occupy the system bus 1.

Therefore, the signals to the same processor P$_i$ are collected from among the occupation acknowledgement signals $\overline{P_iACK}$ outputted from the memory access means 16B2$_j$ (j=0,1,...7) (FIG. 7), and outputted as an output 21 of the memory access controller 16B.

As described above, the occupation acknowledgement signal $\overline{P_iACK}$ obtained by the memory access controller 16B is returned from the arbitrator 16 to the processor P$_i$ from which a memory request has been outputted as an operation enable signal; as a result, the processor P$_i$ begins to operate in order to send data to the system bus 1.

Figure 9:
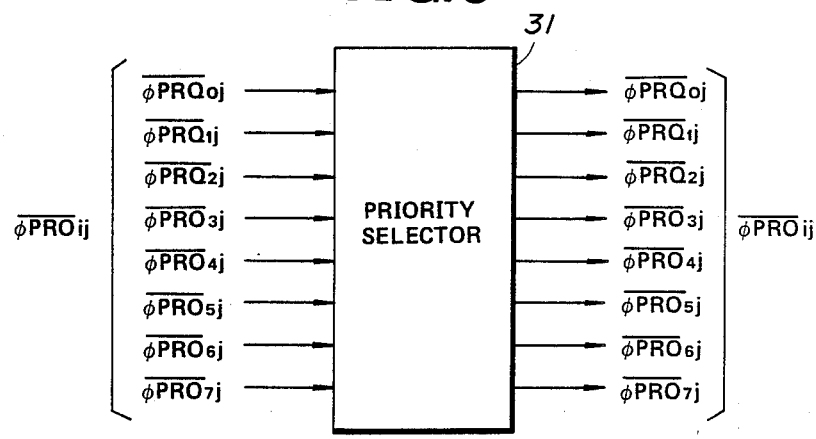
FIG. 9 is a schematic block diagram showing a detailed configuration of the priority selector means shown in FIG. 8.

The priority selector means 31 receives the latch output $\phi\overline{PRQ_{0j}}$ to $\phi\overline{PRQ_{7j}}$ (referred to as $\phi\overline{PRQ_{ij}}$, i=0,1,...7; j=0,1,...7) of the latch circuit 25, as shown in FIG. 9, and outputs a priority selection output signal $\phi\overline{PRQ_{0j}}$ to $\phi\overline{PRQ_{7j}}$ (referred to as $\phi\overline{PRQ_{ij}}$, i=0,1, ...7; j=0,1,...7) beginning from the one having the higher priority level, when these memory bank designation signals have come thereto simultaneously.

In the case of this embodiment, the priority level has previously been determined as shown in FIG. 10. As already described with reference to FIG. 4, the processors P$_0$, P$_1$, P$_2$, P$_3$, P$_4$, P$_5$, P$_6$ and P$_7$ are allocated in sequence to the file storage device (SPS) 5, the data transmitter (NTS) 6, the image read printer (IDS) 7, the image information compressor/decompressor system (CDS) 8, the operation display system (DPS) 9, the main controller (PCS) 10, the preliminary unit 11, and the preliminary unit 12. The priority level is so determined as to become higher in this order. The priority level is determined in such a way that a higher level is allocated to a subsystem including a device to which the necessity of real time processing is high when the memory request is generated, for instance, such as the HDD 5C provided in the file storage device as an external storage device.

As described above, the priority selection output signal $\overline{PRO_{0j}}$, $\overline{PRO_{1j}}$ ... $\overline{PRO_{7j}}$ includes the contents of the memory bank designation signal $\overline{PRQ_{0j}}$, $\overline{PRQ_{1j}}$ ... $\overline{PRQ_{7j}}$ coming on the basis of the memory request outputted from the processor P$_0$, P$_1$ ... P$_7$; the output latch circuit 30 latches the priority selection output $\phi\overline{PRO_{0j}}$, $\phi\overline{PRO_{1j}}$ ... $\phi\overline{PRO_{7j}}$, respectively; and the priority acknowledgement signal $\overline{P_0ACK}$, $\overline{P_1ACK}$ ... $\overline{P_7ACK}$ are outputted.

As described above, in the case where the i-th memory bank MB$_j$ is designated by a plurality of processors simultaneously, one priority selection output signal corresponding to the highest priority memory bank designation signal is latched by the output latch circuit 30, the occupation acknowledgement signal $\overline{P_iACK}$ is given to the processor P$_i$ corresponding to this one priority selection output signal, so that only the corresponding processor P$_i$ can occupy the system bus 1.

In this embodiment, a lock means 32 is provided in the priority selector means 31 (FIG. 8), so that in the processor P$_i$ to which the occupation acknowledgement signal $\overline{P_iACK}$ is given on the basis of the priority selection output signal $\phi\overline{PRO_{ij}}$ obtained and selected by the priority selector means 31, the memory requests from the other processors are refused until a predetermined data processing has been completed, that is, the data processing with respect to the j-th memory bank MB$_j$ is maintained.

The function of the lock means 32 as described above is executed on the basis of the program stored in the local memory 10c (FIG. 1) in the main controller 10. Therefore, in the present embodiment, once a memory bank designation signal is selected as the highest priority from among those coming simultaneously at a point of time, even if thereafter another memory bank designation signal of a higher priority comes, before the processor corresponding to the selected memory bank designation signal will have completed the series of the data processings, the signal of the higher priority is neglected and the j-th memory bank is kept occupied by the previously selected processor.

Further, with respect to specified memory areas in the memory areas of the j-th memory bank, the lock means 32 locks in such a way that the data are allowed to be updated only when the memory bank designation signal based on the memory request from a predetermined processor is selected by the priority selector means 31, so that data stored in a predetermined memory bank can be saved.

Figure 5:
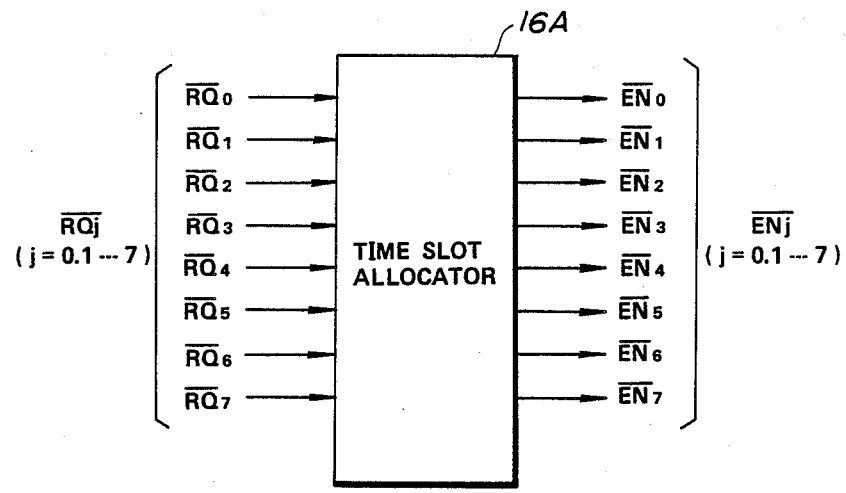
FIG. 5 is a schematic block diagram showing a detailed configuration of the time slot allocator 16A shown in FIG. 4.
Figure 6:
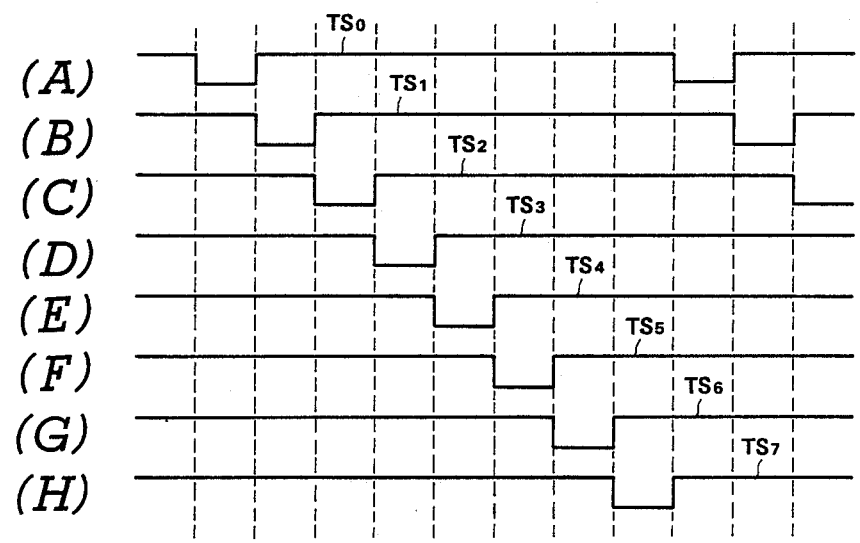
FIG. 6 is a signal waveform diagram showing a plurality of time-series time slot signals.

Further, the arbitrator 16 includes a memory bank enable signal generator 16c (FIG. 4). This memory bank enable signal generator 16c, as shown in FIG. 11, has a latch circuit 41 for receiving enable signals $\overline{EN_j}$ outputted from the time slot allocator 16A (FIG. 5). This latch circuit 41 latches the enable signals $\overline{EN_j}$ in dependence upon the clock $\phi$, and outputs the latch outputs as bank enable signals $\overline{BENB_j}$ respectively. This bank enable signal $\overline{BENB_j}$ is given to the j-th memory bank as an operation enable signal, so that the j-th memory bank $MB_j$ begins the operation such that data are received from the system bus 1 or data stored therein are sent to the system bus 1 (a series of the above operation is called a memory cycle).

In this memory cycle operation status, the j-th memory bank $MB_j$ does not output the busy signal $\overline{BUSY_j}$ to the arbitrator 16, so that the present memory cycle operation is known to the arbitrator 16.

As described above, during the operation of the memory banks $MB_0$ to $MB_7$, the bus clock BCLK is supplied from the arbitrator 16 to each memory bank in order to operate the memory bank in synchronization with the processors $P_0$ to $P_7$ via the arbitrator 16.

Figure 12:
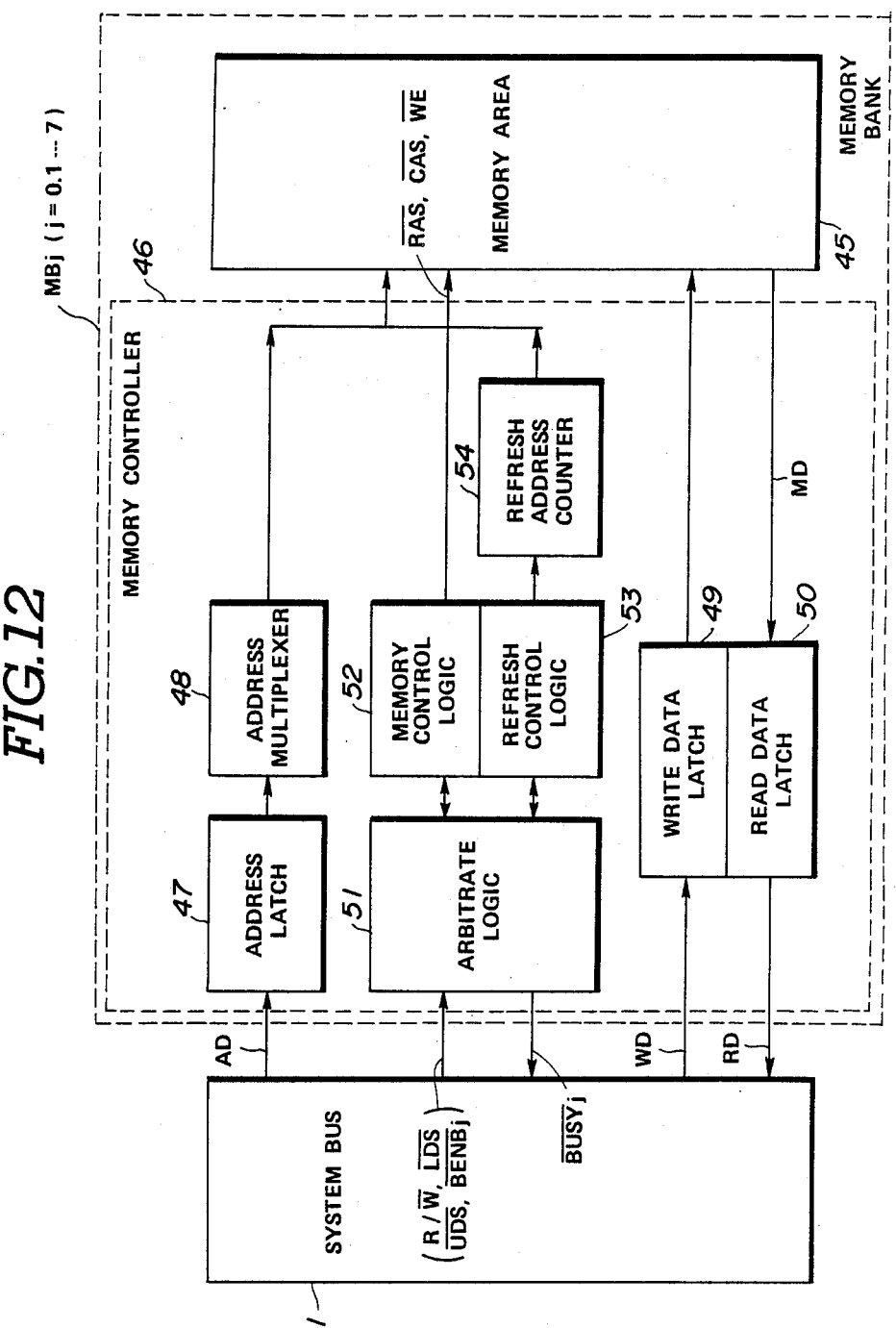
FIG. 12 is a schematic block diagram showing a detailed configuration of the memory banks shown in FIG. 4.

As shown in FIG. 12, the memory bank $MB_j$ configuring the memory section 15 (see FIG. 4) is made up of memory areas 45 composed of dynamic RAMs, for instance, and a controller 46. The address data AD coming through the address data line ADDRESS in the system bus 1 are latched by the address latch circuit 47 in response to the leading edge of the bus clock BCLK, for instance. The latch output is separated into row data and column data in an address multiplexer 48 to designate a row address and a column address of a memory location to be processed in the memory area 45.

On the other hand, write data WD coming through the write data line WDATA in the system bus 1 is latched by a write data latch circuit 49, and the latch output is inputted to the memory area 45. Further, memory data MD read from the memory area 45 is latched by a read data latch circuit 50 and the latch output RD is sent out to the read data line RDATA in the system bus 1 in response to an output timing signal generated by a memory control logic 52.

Further, the memory controller 46 includes an arbitrate logic 51, and receives the selection signal supplied from a high level bit selection line $\overline{LDS}$ and a low level bit selection line $\overline{UDS}$ in the system bus 1, a write/read command signal $R/\overline{W}$, and a bank enable signal $\overline{BENB_j}$ supplied from the arbitrator 16, in order to drive and control the memory bank $MB_j$ on the basis of these signals. That is, by applying a drive signal at a predetermined timing to the row and column of the memory area 45 through the memory control logic 52, data is stored at a memory location having a row and a column designated by an address multiplexer 48, or the data is read at this memory position.

Further, under the control of an arbitration logic 51, a refresh address counter 54 is driven by a refresh control logic 53, in order to refresh each memory cell in the memory area 45 in sequence at predetermined time intervals, of, for instance, 14 sec, for saving the stored data.

Operation of the Embodiment

In the configuration as described above, the data processors execute data processing in synchronization with the bus clock BCLK shown in FIG. 13(A). In this embodiment, the period of the bus clock BCLK is selected to be shorter than the cycle time required when each memory bank $MB_0$ to $MB_7$ in the memory section 15 operates once to read or write data (in the case of dynamic RAMs, a cycle time of 230 nsec is required for precharge and refresh operations), for instance, such as one-third; that is, the period TCK is 76.7 nsec. Each system unit is operated in synchronization with the leading or trailing edges of this bus clock BCLK.

The time slot allocator 16A in the arbitrator 16 generates the time slot signals $TS_0$ to $TS_7$ (FIG. 6) having a time slot corresponding to one period (time segment TCK) on the basis of this bus clock BCLK, and allocates the time slots to the 0-th to 7-th memory banks $MB_0$ to $MB_7$ for each succeeding one period time segment of the bus clock BCLK, so that the system is accessed to read and write data from and to the corresponding memory banks $MB_0$ to $MB_7$ for each time slot.

Figure 13:
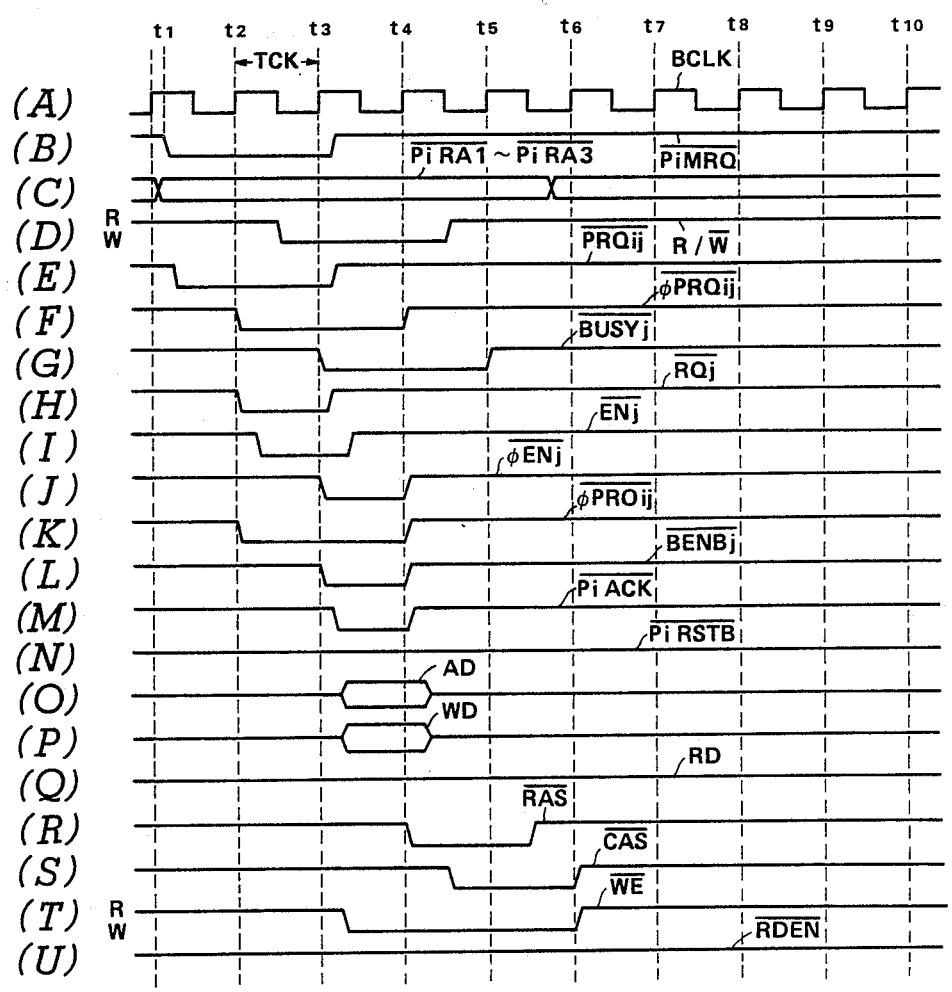
FIGS. 13 to 16 are signal waveform diagrams showing signals of each section.

Assume, for the sake of example, that at the time point $t_1$ in FIG. 13, a memory request is outputted from the i-th processor $P_i$ to the j-th memory bank $MB_j$. At this time, a memory request signal $\overline{P_iMRQ}$ (FIG. 13(B)), representative of the presence of memory request, and a memory bank number signal $\overline{P_iRA1}$ to $\overline{P_iRA3}$ (FIG. 13(C)), representative of the memory position in the j-th memory bank $MB_j$, are sent from the processor $P_i$ to the arbitrator 16B. These signals are supplied to the i-th decode means $16B1_i$ of the memory access controller 16B (FIG. 7), decoded into a memory bank designation signal $\overline{PRQ_{ij}}$ (FIG. 13(E)), and then supplied to the j-th memory access means $16B2_j$.

The memory access means $16B2_j$ (FIG. 8) receives this memory bank designation signal $\overline{PRQ_{ij}}$ by the latch circuit 25 and this signal is latched in response to the clock $\phi$ synchronized with the bus clock BCLK. As a result, after the memory bank designation signal $\overline{PRQ_{ij}}$ has been generated, the latch circuit 25 generates a latch output $\phi\overline{PRQ_{ij}}$ (FIG. 13(F)) at the time point $t_2$ when the bus clock BCLK first rises.

When the j-th memory bank $MB_j$ to which the memory request is outputted from the processor $P_i$ is not in a memory cycle operation at the time point $t_2$ at which the latch output $\phi\overline{PRQ_{ij}}$ is generated, a busy signal $\overline{BUSY_j}$ is given from the memory bank $MB_j$ to the arbitrator 16 (FIG. 13(G)). Therefore, when the latch output $\phi\overline{PRQ_{ij}}$, the logic level of which is reversed through the NOR circuit 26, is given to the NAND gate 27 in the memory access means $16B2_j$ (FIG. 8), a request signal $\overline{RQ_j}$ (FIG. 13(H)), the logic level of which falls, can be obtained at the output terminal and applied to the time slot allocator 16A (FIG. 5).

As described with reference to formula (4), the time slot allocator 16A generates an enable signal $\overline{EN_j}$ (FIG.

13(I)) at the timing of the time slot allocated to the j-th memory bank $MB_j$ from which a memory request is outputted, and returns this signal to the NAND gate 28 in the memory access means $16B2_j$. Since a request signal $\overline{RQ_j}$ is given to this NAND gate 28, the output $\overline{ENO}$ is by the latch circuit 29 at the timing of the succeeding clock $\phi$, so that at this timing $t_3$, a latch output enable signal $\overline{\phi EN_j}$ (FIG. 13(J)) is outputted.

When the latch output $\overline{\phi PRQ_{ij}}$ (FIG. 13(F)) is given to the priority selector means 31 in the memory access means $16B2_j$, this priority selector means 31 operates for priority selection. Here, if the memory request is not competitive to the j-th memory bank $MB_j$, the priority selector means 31 gives a priority selection output $\overline{\phi PRO_{ij}}$ (FIG. 13(K)) corresponding to the latch output $\overline{\phi PRQ_{ij}}$ to the output latch circuit 30. Therefore, the output latch circuit 30 begins the latch operation in response to the clock $\phi$ when the latch output $\overline{\phi EN_j}$ (FIG. 13(J)) of the latch circuit 29 is generated on the basis of the clock $\phi$, and outputs an occupation acknowledgement signal $\overline{P_iACK}$ (FIG. 13(M)) to the i-th processor $P_i$.

The processor $P_i$ which receives this occupation acknowledgement signal $\overline{P_iACK}$ restores the output of the memory bank designation signal $\overline{PRQ_{ij}}$ (FIG. 13(E)), and then outputs an address data AD ( 13(0)) to the address data line ADDRESS in the system bus 1. At the same time, when the processor $P_i$ writes data in the memory bank $MB_j$ which has outputted the memory request, the processor $P_i$ outputs the data WD to be written to the data line WDATA, and lowers a write-/read instruction R/$\overline{W}$ (FIG. 13(D)) to a write-mode level.

As described above, it is possible to realize the state where the i-th processor $P_i$ occupies the system bus 1.

In this state, since a bank enable signal $\overline{BENB_j}$ (FIG. 13(L)) synchronizing with the bus clock BCLK is given from the arbitrator 16 to the j-th memory bank $MB_j$, the address data AD (FIG. 13(0)) and the write data WD (FIG. 13(P)) in the address bus ADDRESS are latched by the address latch circuit 47 and the write data latch circuit 49 in the memory bank $MB_j$ (FIG. 12) at the time point of the first leading edge of the bus clock BCLK.

Once this latch state is obtained, the memory control logic 52 in the memory bank $B_i$ generates a row address signal $\overline{RAS}$ (FIG. 13(R)) and a column address signal $\overline{CAS}$ (FIG. 13(S)) to the memory area 45 and simultaneously lowers a write/read control signal $\overline{WE}$ (FIG. 13(T)) to the write-mode level. Therefore, the write data WD latched by the write data latch circuit 49 is written at the memory location designated by the address data latched by the address latch circuit 47 in the memory area 45 of the memory bank $MB_j$.

As described above, it is possible to transfer and write data in the shared storage device 2 through the system bus 1 on the basis of the memory request $\overline{P_iMRQ}$ (FIG. 13(B)) outputted from the i-th processor $P_i$.

In FIG. 13, the operation has been described for the case where data is written from the i-th processor $P_i$ to the j-th memory bank $MB_j$, that is, of the write mode. However, when the i-th processor $P_i$ reads data stored in the j-th memory bank $MB_j$ in the so-called read mode, the data is read under the control of the arbitrator 16, as shown in FIG. 14.

Figure 14:
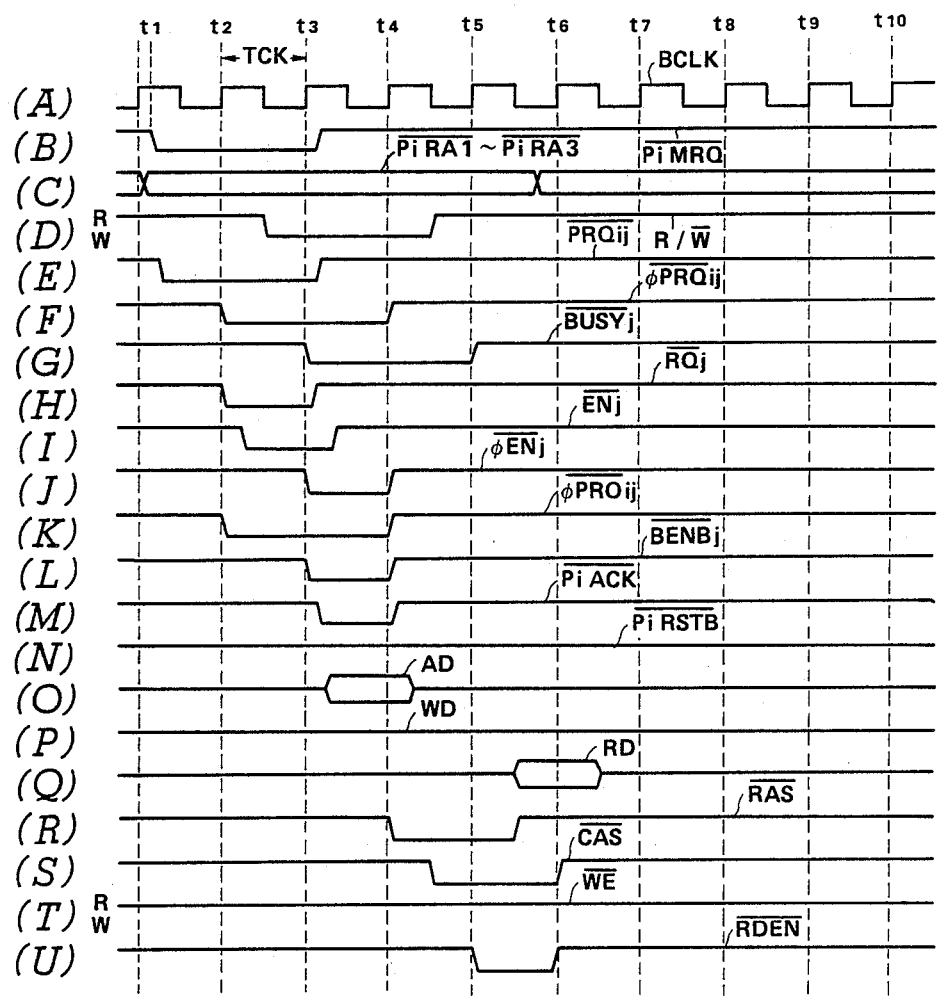

In FIG. 14 which corresponds to FIG. 13, when a memory request $\overline{P_iMRQ}$ (FIG. 14(B)) is generated from the i-th processor $P_i$ at the time point $t_1$, similarly to the case of FIG. 13(A) to (N), the arbitrator 16 receives a request signal $\overline{RQ_j}$ on the basis of the memory request in the memory access means $16B2_j$ (FIG. 8), and generates an enable signal $\overline{EN_j}$ (FIG. 14(I)) at the time slot corresponding the j-th memory bank $MB_j$ in the time slot allocator 16A (FIG. 5). On the basis of this enable signal $\overline{EN_j}$, the memory access means $16B2_j$ gives an occupation acknowledgement signal $\overline{P_iACK}$ to the i-th processor $P_i$ (FIG. I4(M)), and further the memory bank enable signal generator 16C (FIG. 11) generates a bank enable signal $\overline{BENB_j}$ (FIG. 14(L)) to the j-th memory bank $MB_j$.

As a result, the processor $P_i$ outputs an address data AD to the address line ADDRESS (FIG. 14(0)). At this time, a memory bank designation data signal $\overline{P_iRA1}$ to $\overline{P_iRA3}$ is supplied from the processor $P_i$ to the arbitrator 16 together with the memory request $\overline{P_iMRQ}$ (FIG. 14(B)). Simultaneously, since a read/write instruction R/$\overline{W}$ (FIG. 14(D)) is given to the system bus 1, a bank enable signal $\overline{BENB_j}$ of the memory bank $MB_j$ is given to the arbitration logic 51 to maintain the write/read control signal $\overline{WE}$ of the memory control logic 52 at the read signal level (FIG. 14(T)) and also gives row and column drive signals $\overline{RAS}$ and $\overline{CAS}$ to the memory area 45. Therefore, in the memory area 45, the data MD stored at the memory location designated by the address data AD latched by the address latch circuit 47 is latched by the read data latch circuit 50.

The read data latched by the read latch circuit 50 is outputted as read data RD (FIG. 14(Q)) to the read data line RDATA in the system bus 1 at the timing of the trailing edge of a read data output signal $\overline{RDEN}$ (FIG. 14(D)) generated by the memory controller 50 separately.

Therefore, it is possible to obtain the state where the data is read from the j-th memory bank $MB_j$ while occupying the system bus 1 on the basis of the data read request of the i-th processor $P_i$. In this state, the arbitrator 16 sends a strobe signal $\overline{P_iRSTB}$ (FIG. 14(N)) to the processor $P_i$ to indicate that the requested data is outputted to the system bus 1.

At this moment, the processor $P_i$ receives the data MD outputted to the system bus 1 since the strobe signal $\overline{P_iRSTB}$ rises at the time point $T_6$ when the bus clock BCLK rises.

As described above, after a memory request has been outputted from the processor $P_i$ and when a time corresponding to about four periods of the bus clock BCLK has elapsed, the data read from the memory block $MB_j$ is received into the processor $P_i$.

As shown in FIGS. 13 and 14, where only a single processor outputs a memory request to a given memory bank $MB_j$ at one point in time, since there exists no competitive relationship, whenever the processor $P_i$ generates a memory request to the memory bank $MB_j$, the arbitrator 16 generates an enable signal $\overline{EN_j}$ at the time slot allocated to the corresponding memory bank $MB_j$, so that data is written or read in or from the memory location the address of which is designated according to the contents of the memory request. As described above, when non-competitive memory requests are generated to all the memory banks $MB_0$ to $MB_7$, basically the data processing is executed according to the contents of the memory request by the use of the time slot allocated to each memory bank.

In contrast with this, in a competitive state where a plurality of memory requests are outputted from a plurality of processors simultaneously to one memory bank $MB_j$ and further where there exist memory banks $MB_0$ to MB$_7$ outputting no memory request, the arbitrator 16 processes the memory requests beginning from a memory request having the highest priority in sequence, and the data processing is executed by the use of the time slots allocated to the memory banks from which no memory request is outputted.

Figure 15:
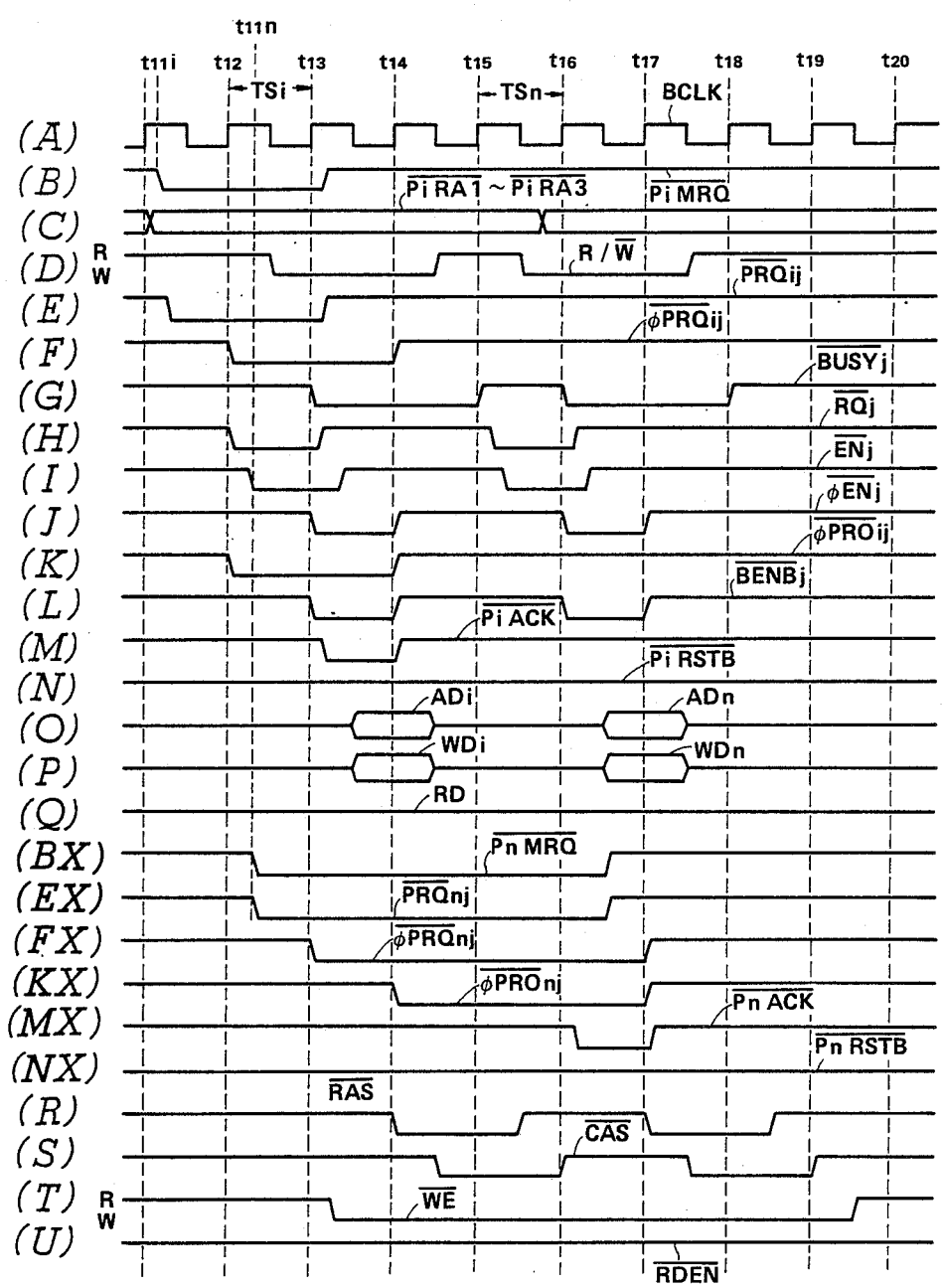

For instance, as shown in FIG. 5, the case will be considered such that: after a memory request P$_i$MRQ, (FIG. 15(B)), for the writing of data from the i-th processor P$_i$ to the j-th memory bank MB$_j$ at the time point t$_{11i}$, at the time point t$_{11n}$ at which the data processing to this memory request is not completed, a memory request $\overline{P_nMRQ}$ (FIG. 15 (Bx)) issues for the writing of data from the n-th processor P$_n$ to the j-th memory bank MB$_j$. In this case, since no processor outputs a memory request to the (j+3)-th memory bank MB$_{(j+3)}$, the time slot corresponding to that memory bank is empty.

At this state, the memory request $\overline{P_iMRQ}$ generated at time point t$_{11i}$ and the memory request $\overline{P_nMRQ}$ generated at time point t$_{11n}$ are both given to the arbitrator 16 in sequence, and the memory bank designation signals $\overline{PRQ_{ij}}$ and $\overline{PRQ_{nj}}$ are given to the memory access means 16B2$_j$ (FIG. 8) corresponding to the j-th memory bank MB$_j$ through the decode means 16B1$_i$ and 16B1$_n$ provided for the i-th and the n-th processors P$_i$ and P$_n$.

First, at the time point t$_{11i}$, when a memory request for the writing of data is outputted from the i-th processor P$_i$ to the j-th memory bank MB$_i$, in the same way as described with reference to FIG. 13, the time slot allocator 16A in the arbitrator 16 generates an enable signal $\overline{EN_j}$ during the time slot TS$_i$ allocated to the j-th memory bank MB$_j$ (FIG. 15 (I)), and an occupation acknowledgement signal $\overline{P_iACK}$ is given from the memory access means 16B2$_j$ (FIG. 8) to the i-th processor P$_i$ on the basis of this enable signal $\overline{EN_j}$. At the same time, the memory bank enable signal generator 16c generates a bank enable signal $\overline{BENB_j}$ corresponding to the j-th memory bank MB$_j$ on the basis of the enable signal $\overline{EN_j}$ during the period of the bus clock next succeeding to the time slot TS$_i$ (FIG. 15(L)).

Therefore, the processor P$_i$ outputs an address data AD$_i$ (FIG. 15 (0)) and a write data WD$_i$ (FIG. 15(P)) to the system bus 1, and in the memory bank MB$_j$ these data are latched at the time point t$_{14}$ by the address latch circuit 47 and the write data latch 49 (FIG. 12).

When the memory request $\overline{P_nMRQ}$ (FIG. 15(Bx)) for the writing of data is outputted at the time point t$_{11n}$ from the processor P$_n$ to the memory bank MB$_j$, during the above-mentioned cycle in which data is written from the processor P$_i$ to the memory bank MB$_j$, a latch output $\phi\overline{PRQ_{nj}}$ corresponding thereto is supplied from the latch 25 in the memory access means 16B2$_j$ (FIG. 8) to the priority selector 31. However, at this time point t$_{11n}$, since the latch output $\phi\overline{PRQ_{ij}}$ (FIG. 15(F)) has already been given from the latch circuit 25 on the basis of the memory request from the processor P$_i$, the priority selector means 31 is already in a state where the latch output $\phi\overline{PRQ_{ij}}$ is selected with priority and the priority selector means 31 outputs an occupation acknowledgement signal $\overline{P_iACK}$ corresponding thereto. Since this state is not changed even if the latch output $\phi\overline{PRO_{nj}}$ is given to the priority selector means 31 at the t point t$_{11n}$, the present state is maintained provided that the memory request $\overline{P_iMRQ}$ (FIG. 15(B)) from the processor P$_i$ does not disappear and therefore no latch output $\phi\overline{PRQ_{ij}}$ is supplied to the priority selector 31. As a result, the data processing on the basis of the memory request $\overline{P_nMRQ}$ (FIG. 15(Bx)) from the processor P$_n$ is kept waiting until the data processing on the basis of the memory request $\overline{P_iMRQ}$ from the processor P$_i$ has been completed.

As has already been explained, in the priority selector means 31 (FIGS. 9 and 10), the above relationship is applied as it is even if the priority level of the n-th processor P$_n$ is higher than that of the i-th processor P$_i$. This is because it is necessary to execute data processing securely by maintaining the data processing cycle of data previously selected on the basis of priority level until the data processing has been completed even if the memory request is outputted from the processors of low priority level.

The above-mentioned stand-by state is maintained until the data AD$_i$ and WD$_i$ latched by the memory bank MB$_j$ have been written at the time point t$_{15}$ on the basis of the row and column designation signals $\overline{RAS}$ (FIG. 15(R)) and $\overline{CAS}$ (FIG. 15(S)) and the write/read control signal $\overline{WE}$ (FIG. 15(T)) to the memory area 45. When data writing has been completed at the time point t$_{15}$, the memory bank MB$_j$ reverses the busy signal $\overline{BUSY_j}$ (FIG. 15(G)) and informs the arbitrator 16 that the memory cycle of the memory bank MB$_j$ has been completed.

At this moment, the memory access means 16B2$_j$ (FIG. 8) in the arbitrator 16 lowers the logic level of the request signal $\overline{RQ_j}$ (FIG. 15(H)) by the NAND gate 27 according to the change of the busy signal BUSY$_j$. Here, the latch output $\phi\overline{PRQ_{ij}}$ (FIG. 15(F)) of the processor P$_i$ in which the processing has already been completed is not obtained in the latch circuit 25; however, the latch output $\phi\overline{PRQ_{nj}}$ (FIG. 15(FX)) of the processor P$_n$ is still obtained, so that the request signal $\overline{RQ_j}$ immediately responds to the change of busy signal $\overline{BUSY_j}$.

Therefore, the request signal $\overline{RQ_j}$ is generated during the time slot TS$_n$ allocated to the (j+3)-th memory bank MB$_{(j+3)}$, the time slot allocator 16A (FIG. 5) determines that the time slot allocated to the (j+3)-th memory bank MB$_{(j+3)}$ is empty and, as stated with reference to the formula (4), outputs an enable signal $\overline{EN_j}$ (FIG. 5(I)) for the j-th memory bank MB$_j$ at the tim of the empty time slot TS$_n$.

Therefore, the output latch 30 in the memory access means 16B2$_j$ latches a priority selection output $\phi\overline{PRO_{nj}}$ outputted from the priority selector means, 31 and outputs a priority acknowledgement signal $\overline{P_nACK}$ corresponding thereto to the n-th processor P$_n$. At the same time, since the enable signal $\overline{EN_j}$ is obtained again, a bank enable signal $\overline{BENB_j}$ is outputted from the memory bank enable signal generator 16c (FIG. 11) at the succeeding period of the bus clock BCLK (FIG. 15(L)).

Therefore, the processor P$_n$ outputs the address data AD$_n$ (FIG. 15(0)) and the write data WD$_n$ (FIG. 15(P)) to the system bus 1, and writes these data on the basis of the signals $\overline{PAS}$, $\overline{CAS}$, and $\overline{WE}$, after the memory bank MB$_j$ (FIG. 12) latches these data in the address data latch circuit 47 and the write data latch circuit 49.

When the above write operation has been completed, the memory bank MB$_j$ reverses the busy signal $\overline{BUSY_j}$ to inform the arbitrator 16 that the corresponding memory cycle has been completed, and returns to the original state.

As described above, when the memory requests from a plurality of processors are generated in sequence to the same memory bank, the arbitrator 16 arbitrates the competition in such a way as to sequentially acknowledge the occupation of the system bus 1 and the designated memory bank to each processor in accordance with the order of occurrence. And in executing the data processing to a plurality of memory request in sequence, if some time slot is empty other than the time slot allocated to the j-th memory bank $MB_j$ to which the memory request is made, the data processing is executed by the use of this empty time slot. Further, in FIG. 15, there has been described the case where the competitive relationship can be arbitrated when a plurality of memory requests are generated sequentially with some time difference. However, in the case where a plurality of memory requests are generated simultaneously without time difference, the competition of the memory requests can be arbitrated in the same way as described above, except that the priority selector means 31 selects a processor of higher priority level (FIG. 10) from among those which generate a memory request and sequentially generate occupation acknowledgement signals.

Figure 16:
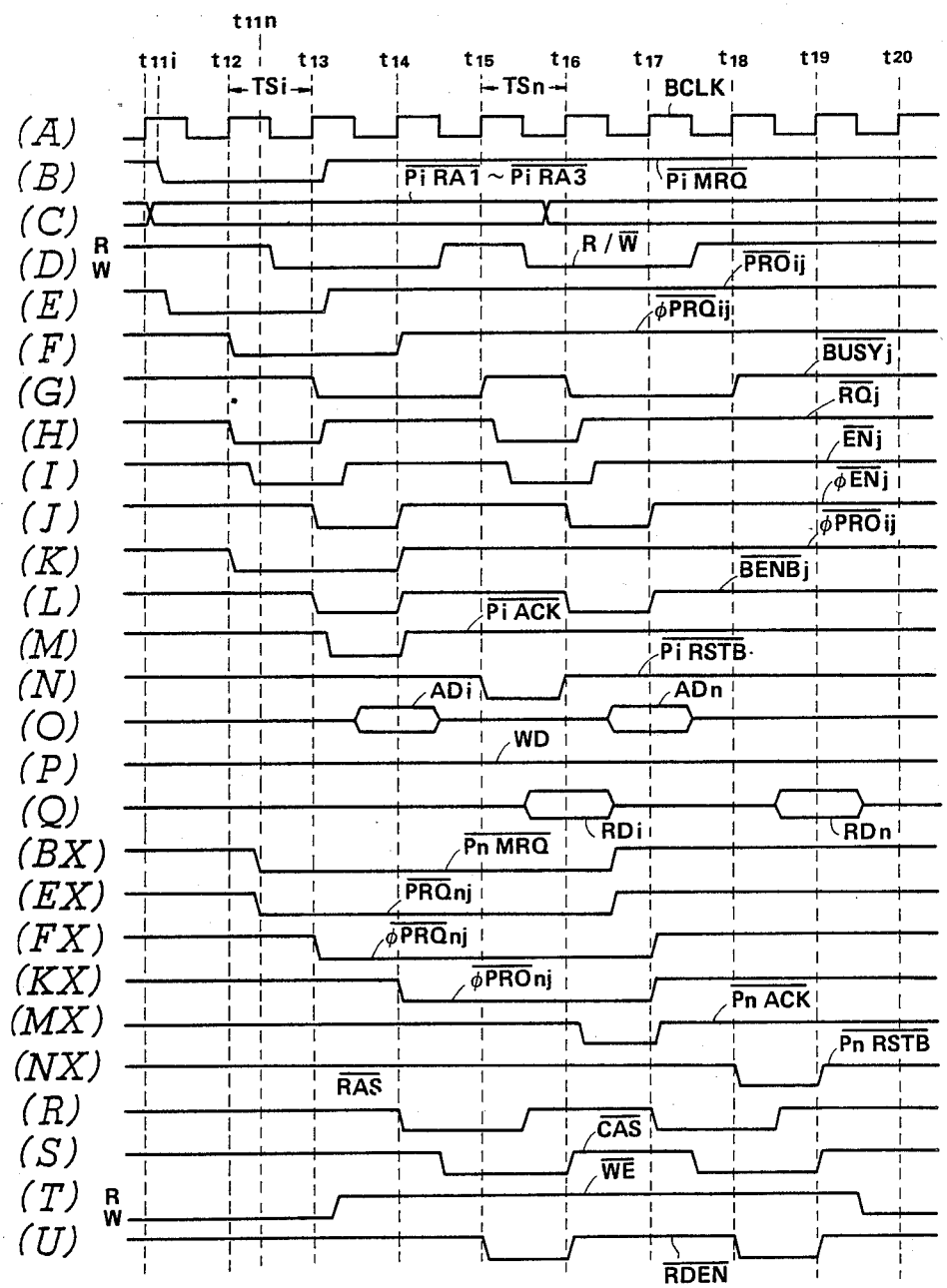

With reference to FIG. 15, the case has been described where the contents of two competitive memory requests require that data are written in the same memory bank. However, in the case where the contents require that data stored in the memory bank are read, the arbitrator 16 operates as shown in FIG. 16. The difference between the case described with reference to FIG. 16 and the case described with reference to FIG. 15 is that the read time required to read data from the memory bank is longer than that required to write data therein, but the operation of the arbitrator 16 is otherwise the same as in FIG. 15.

That is, in this case, the memory bank enable signal $\overline{BENB_j}$ (FIG. 16(L)) outputs the address data $AD_i$ (FIG. 16(O)) to the system bus 1 on the basis of the enable signal $\overline{EN_j}$ generated during the time slot $TS_i$, and the data is latched by the address latch circuit 47 in the memory bank $MB_j$. This latch output designates the memory location on the basis of the row and column drive signal $\overline{RAS}$ and $\overline{CAS}$ and the write/read control signal $\overline{WE}$ having a read mode level, so that the stored data is read from the memory area 45 and latched.

This latch output is outputted to the system bus 1 in response to the read data output signal $\overline{RDEN}$ (FIG. 16(U)) generated during the succeeding one period of the bus clock BCLK, so that it is possible to obtain the state where the read data $RD_i$ (FIG. 16(Q)) corresponding to the memory request is outputted from the i-th processor $P_i$ to the system bus 1. When the memory bank $MB_j$ outputs data to the bus 1 as described above, at the time point $t_{15}$ the signal level of the busy signal $\overline{BUSY_j}$ (FIG. 16(G)) is reversed to inform the arbitrator that the memory cycle has been completed. Therefore, the arbitrator 16 gives the strobe signal $\overline{P_iRSTB}$ (FIG. 16(N)) to the processor $P_i$, so that the processor $P_i$ receives the data $RED_i$ outputted to the system bus 1 at the timing of the leading edge of the strobe signal $\overline{P_iRSTB}$ at the time point $t_{16}$. As described above, it is possible to read the data from the memory bank $MB_j$ to the processor $P_i$ during the four periods of the bus clock BCLK from the time point $t_{11j}$ at which the memory request $\overline{P_iMRQ}$ is generated from the processor $P_i$. The time required to read the data is fairly long as compared with the case in FIG. 15 where two periods are required to write data. However, although the time required for the whole reading operation is long as shown in FIG. 16, since the time required to occupy the bus system 1 successively is one cycle of the bus clock BCLK, it is possible to effectively avoid the problem of obstruction that exists when the processor $P_n$, standing-by the processing of data due to competition, occupies the system bus 1.

That is, in the case of FIG. 16, the busy signal $\overline{BUSY_j}$ indicative that data processing has been completed by the processor $P_i$ changes at the time point $t_{15}$ in the same way as in FIG. 15. Therefore, in the case of FIG. 16, in order to process the data in the processor $P_n$, it is possible to generate the enable signal $\overline{EN_j}$ (FIG. 16(I)) during the time slot allocated to the (j+3)th memory bank MB (J+3). This enable signal $\overline{EN_j}$ is generated by the arbitrator 16. On the basis of this enable signal $\overline{EN_j}$, an address data $AD_n$ on the basis of the memory request of the processor $P_n$ is outputted to the system bus 1 during the succeeding period of the bus clock BCLK, and latched by the address latch circuit 47 in the memory bank $MB_j$ at the end time point $t_{10}$ of this period.

However, when the data on the basis of the memory request of the processor $P_n$ is outputted to the system bus 1 as described above, since the data $RD_i$ read from the memory bank $MB_j$ on the basis of the memory request of the processor $P_i$ have already been received by the processor $P_i$ at the time point $t_{16}$, it is possible to avert the situation that two data are outputted to the system bus 1 simultaneously.

As described above, after the data stored at the memory position designated by the address data $AD_n$, outputted to the system bus 1, has been latched in the read data latch circuit 50, the latch output $\overline{RDEN}$ (FIG. 16 (U)) is outputted to the system bus 1 and the data is received in the processor $P_n$ at the timing of the leading edge of the strobe signal $\overline{P_nRSTB}$ (FIG. 16 (NX)) generated in the arbitrator 16.

In the case where the data read time is long in the memory bank $MB_j$, it is possible to simultaneously start the data processing successively on the side of the arbitrator 16 while the reading cycle is being executed in the memory bank $MB_j$. Therefore, in sequentially processing these two data, it is possible to compress the time during which each data occupies the system bus 1 to the time corresponding to one period of the bus clock BCLK.

Further, also in the case of FIG. 16, the data is processed in such a way that the occupation of the system bus 1 is acknowledged in sequence beginning from the one having a higher priority level on the basis of the priority level (FIG. 10) allocated to each processor by the priority selector means 31 in the memory access means $16B2_j$ when two memory requests are generated simultaneously without time difference.

As must be clearly understood from FIG. 13 or FIG. 16, the enable signal $\overline{EN_j}$ is generated during the time slot allocated to the bank, and the bank enable signal $\overline{BENB_j}$ is generated during the succeeding time slot. Further, when a time period of about 1.5 times the period of the time slot has elapsed after the enable signal $\overline{EN_j}$ has been generated, the address data AD is outputted the address data line ADDRESS, or the write data WD is outputted to the write data line WDATA if in the write mode.

In contrast with this, when a time period of about 2 times the period of the time slot has elapsed after the enable signal $\overline{EN_j}$ has been generated, the memory bank $MB_j$ begins to write and read data (that is, the memory cycle begins). In the data read mode, when a time period of about 2.5 times the period of the time slot has elapsed after the enable signal $\overline{EN_j}$ has been generated, the data RD read from the memory $MB_j$ is outputted to the read data line RDATA. As a result, when a time period of about 3 times the period of the time slot has elapsed after the enable signal $\overline{EN_j}$ has been generated, the processor $P_i$ can receive data stored in the memory bank $MB_j$.

The above operation is repeated whenever the enable signals $\overline{EN_0}$ to $\overline{EN_7}$ are generated to the memory banks $\overline{MB_0}$ to $\overline{MB_7}$, and the enable signals $EN_0$ to $EN_7$ are generated in sequence during the time slots allocated to the respective memory banks $MB_0$ to $MB_7$. Therefore, the times at which the data corresponding to the memory banks $MB_0$ to $MB_7$ is outputted to the address data line ADDRESS, the write data line WDATA, and the read data line RDATA are different from each other, that is, according to the sequence of the allocated time slots. Therefore, even when memory requests are generated at a timing mutually competitive to a plurality of memory banks $MB_0$ to $MB_7$, the system bus 1 can securely write or read data in or from the shared storage device 2 in dependence upon the arbitration and without disorder.

Figure 17:
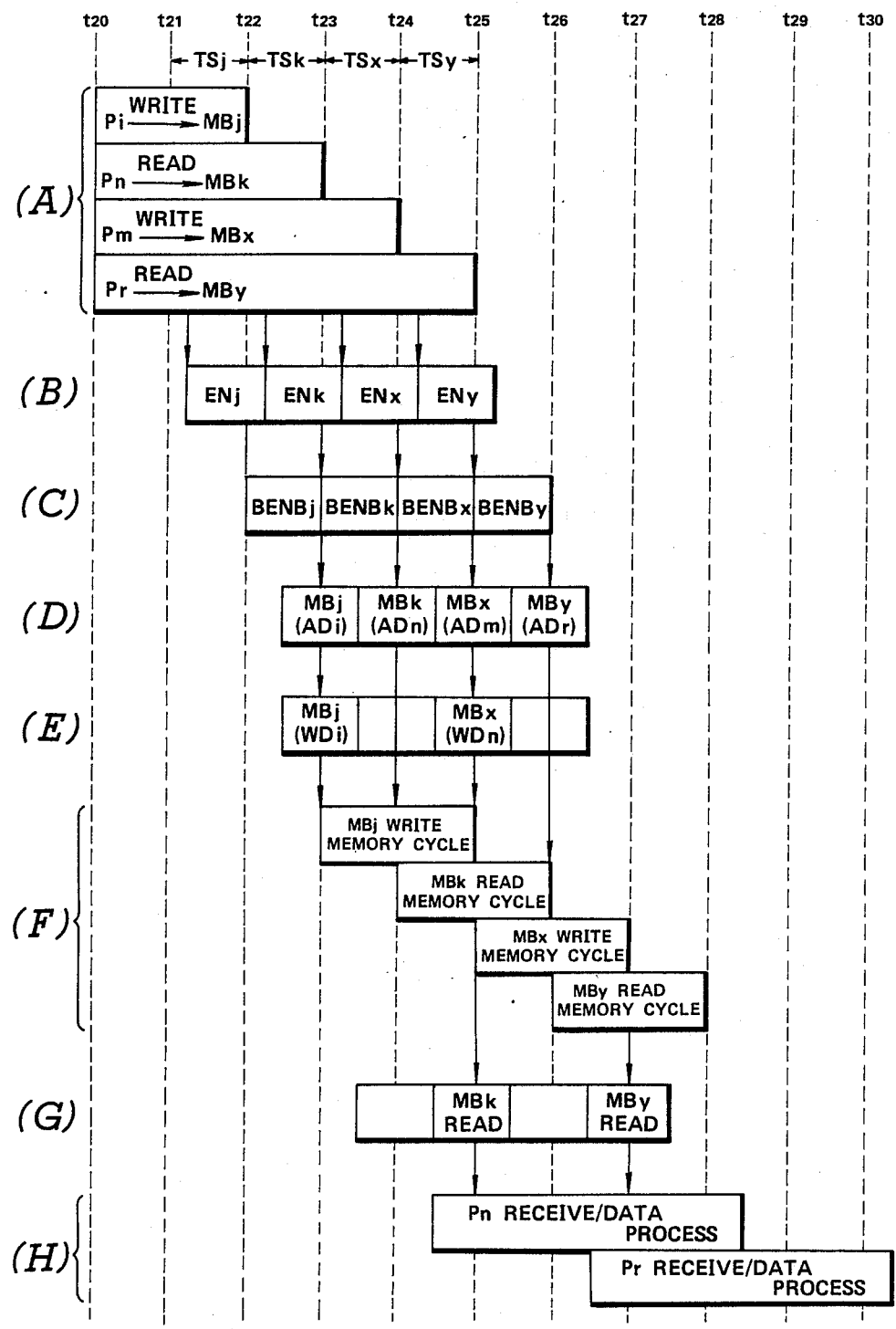
FIG. 17 is a diagram showing the data processing procedure implemented in the data processing system in simultaneous parallel processing fashion.

FIG. 17 shows the arbitration operation when four memory requests are outputted in the same way as described above with reference to FIG. 3. In this case, as shown in FIG. 17(A), a write request is outputted from i-th processor $P_i$ to the j-th memory bank $MB_j$; a read request is outputted from n-th processor $P_n$ to the k-th memory bank $MB_k$; a write request is outputted from the m-th processor $P_m$ to the x-th memory bank $MB_x$; and a read request is outputted from the r-th processor $P_r$ to the y-th memory bank $MB_y$, these requests all being generated at the same time point $t_{20}$.

Here if time slots $TS_j$, $TS_k$, $TS_x$, and $TS_y$ are allocated in sequence to $t_{21}$ to $t_{22}$, $t_{22}$ to $t_{23}$, $t_{23}$ to $t_{24}$ and $t_{24}$ to $t_{25}$, as shown in FIG. 17(B), an enable signal $\overline{EN_j}$ to the j-th memory bank $MB_j$ is generated in the time slot $TS_j$; an enable signal $\overline{EN_k}$ corresponding to the k-th memory bank $MB_k$ is generated in the succeeding time slot $TS_k$; an enable signal $\overline{EN_x}$ corresponding to the x-th memory bank $MB_x$ is generated in the succeeding time slot $TS_x$; and an enable signal $\overline{EN_y}$ corresponding to the y-th memory bank $MB_y$ is generated in the succeeding time slot $TS_y$. As described above, when the enable signals $\overline{EN_j}$, $\overline{EN_k}$, $\overline{EN_x}$ and $\overline{EN_y}$ are generated in sequence in the time slots $TS_j$, $TS_k$, $TS_x$, and $TS_y$ with a time difference of one time slot, according to these signals, the bank enables signals $\overline{BENB_j}$, $\overline{BENB_k}$, $\overline{BENB_x}$ and $\overline{BENB_y}$ and corresponding to each memory bank are similarly generated with a time delay of one time slot (FIG. 17(C)). Further, as shown in FIG. 17(D), addresses $AD_i$, $AD_n$, $AD_m$ and $AD_r$ corresponding to the memory banks $MB_j$, $MB_k$, $MB_x$ and $MB_y$ are outputted in sequence to the address data line ADDRESS with a time delay corresponding to one time slot.

As described above, address locations designated by the processors $P_i$, $P_n$, $P_m$ and $P_r$ in the memory banks $MB_j$, $MB_k$, $MB_x$ and $MB_y$ are designated in sequence without disorder, so that the memory banks $MB_j$, $MB_k$, $MB_x$ and $MB_y$ enter into the write or read memory cycle at the time points delayed one time slot by one time slot (FIG. 17(F)). When entering the memory cycle as described above, the processors $P_i$ and $P_m$, which output a write request to the memory bank, output write data $WD_i$ and $WD_m$ to the write line WDATA at the timing at which the address data $AD_i$ and $AD_m$ are outputted to the address data line ADDRESS. Therefore, in the memory cycle of the memory banks $MB_j$ and $MB_x$, the write data $WD_i$ and $WD_m$ are written respectively to the address locations corresponding to the address data $AD_i$ and $AD_m$, so that the operation with respect to the memory requests of the processors $P_i$ and $P_m$ has been completed.

In contrast with this, in the processors $P_n$ and $P_r$ which output a read request to the memory bank, stored data is read in sequence to the read data line RDATA (FIG. 17(G)) from the address locations corresponding to the address data $AD_n$ and $AD_r$ in the memory banks $MB_k$ and $MB_y$, and outputted in sequence to the read data line RDATA. The above times at which the read data RDATA is outputted to the read data line RDATA are different from each other, because the memory banks $MB_k$ and $MB_y$ begin to start the memory cycle on the basis of the allocated time slots at time points different from each other. Therefore, the processors $P_n$ and $P_r$ outputting read requests can receive the data read from the memory bus banks and $MB_y$ without disorder through the read data line RDATA.

In spite of the fact that each memory cycle of the memory banks $MB_j$, $MB_k$, $MB_x$ and $MB_y$ itself is longer than the time slot, the timing at which data is received from the system bus and the timing at which read data is outputted to the system bus 1 are executed in sequence at one time slot timing, so that the access to the system bus 1 corresponds to one time slot time in practice.

In the same way, in the processors $P_i$, $P_n$, $P_m$ and $P_r$, the timing at which a data is sent out to the system bus 1 and the timing at which a data is received from the system bus 1 are both within one time slot time. Therefore, even if a time longer than one timeslot time is required in sending out data to the system bus 1 and if a device is used which requires a time longer than one time-slot time in processing the received data, since the processor functions in relation to the system bus 1 only during one time slot, even if the data processing time in the processors $P_i$, $P_n$, $P_m$ and $P_r$ is much longer than one time-slot period, the processor functions as a device which can operate during one time-slot time to the system bus 1.

Therefore, even if a dynamic memory of a long memory cycle is used for the memory banks and microprocessors of low processing speed are used as the processors, the device can function in regard to the system bus 1 like a device processing with respect to continuous time slots. Therefore, it is possible to extend the memory and the processor throughput in the whole of the time slots by that amount corresponding to the number of memory banks configuring the memory units and the number of microprocessors configuring the processors, thereby obtaining a data processor having sufficient data processing functions for practical use.

Further, although there exists a time interval during which write data is sent from another processor to the system bus 1 at the timing when data is read from the shared memory device 2 to the system bus 1 (for instance, at the time point $t_{25}$ in FIG. 17), since the read data is sent to the read data line RDATA and the write data is sent to a different write data line WDATA, no disorder will be produced.

Other Embodiments will be described hereinbelow:

(1) In the above embodiment, the time slots are allocated to all of the memory banks $MB_0$ to $MB_7$. However, it is also possible to provide time slots to which no memory bank is allocated. In such a case, the time slot allocator 16A (FIG. 5) in the arbitrator 16 determines the time slot to which no memory bank is allocated to be an empty channel on the basis of the previous dependence function based on the above-mentioned formula (4) and executes the data processing for the request to the memory bank to which the time slot is allocated. This method can hasten the processing of a memory request to the memory bank allocated to a time slot next to one to which no memory bank is allocated.

(2) In the case of the above-mentioned embodiment, as understood with reference to FIG. 1, the devices 5 to 12 allocated to each subsystem are so constructed as to perform each different allotted task. However, it is also possible to provide two or more subsystems for performing the same task. In this way, in the case where there exists a processing step in which an extremely complicated task is included among a series of data processing steps $PR_0$ to $PR_4$ (FIG. 2), it is possible to divide the task in the processing step into two or more subsystems. Therefore, in this case, since it is possible to make the data processing time at each processing step approximately equal to a constant time, it is possible to reduce the time during which a subsystem having completed the earlier data processing waits for another subsystem which has not yet completed its data processing, when each subsystem executes the processing of each divisional data simultaneously in parallel. Thus it is possible to expand the throughput of the whole processor.

Further, in the case where a processor in a subsystem must continue data processing after another processor in another subsystem has completed data processing because of an extremely large amount of data to be processed, it is possible to share the task to the processors in the subsystems in which the task has already been completed.

In this method, it is possible to effectively utilize a processor, stopping the operation after the processing of data allocated to the processor has been completed, thus making it possible to shorten the data processing time required for a processor having a large task.

As described above, according to the present invention, a task is shared by a plurality of processors connected to a system bus respectively; a shared storage device provided in common for these processors is made up of a plurality of memory banks connected to the system bus respectively; data to be sent and received between the processors and the memory banks are divided into a predetermined amount of divisional data; the data processing is executed for each divisional data simultaneously in parallel fashion; and each memory bank can be occupied simultaneously in parallel fashion to each memory request outputted from each processor. Therefore, even if versatile devices of relatively slow data processing speed are used as the processor or the shared storage device, it is possible to realize a data processor of sufficiently large throughput as a whole. As a result, it is possible to construct a data processing system suitable to means for processing image data having an extraordinary large amount of data to be processed, without providing special specifications, in dependence upon versatile devices.

It will be understood by those skilled in the art that the foregoing description is in terms of a preferred embodiment of the present invention wherein various changes and modifications may be made without departing from the spirit and scope of the invention, as set forth in the appended claims.

What is claimed is:

1. A data processing system of the type having a system bus, including a bus clock, one or more data input means for inputting data, display means for displaying inputted data and processed data, storage means for storing the input data and the processed data, and shared storage means connected to each of the above means through the system bus, the system processing data as designated by the data input means, wherein the system comprises
    (a) a plurailty of memory bank means, each of which is connected to the system bus and which together constitute the shared storage means;
    (b) a plurality of separate processor means provided for each of the data input means, the display means and the data storage means, respectively, for separately processing data for each of them, each of the separate processor means being connected to the system bus and being capable of generating a memory request command signal on the system bus for the purpose of transferring data between itself and any one of the memory bank means;
    (c) arbitration means within the shared storage means which is responsive to a memory request command signal generated by one of the processor means for generating separate enable signals to acknowledge occupation of one of the memory bank means by the one processor means which generated the memory request; and
    (d) data dividing means for dividing data transferred between the one processor means and the one memory bank means into predetermined groupings of divisional data and for processing each divisional data in synchronization with the bus clock of the system bus and in simultaneous parallel fashion when a plurality of memory requests are out-putted simultaneously from a plurality of the processor means.

2. A data processing system of the type having a system bus, including a bus clock, one or more data input means for inputting data, display means for displaying inputted data and processed data, storage means for storing the input data and the processed data, and shared storage means connected to each of the above means through the system bus, the system processing data as designated by the data input means, wherein the system comprises
    (a) a plurality of memory bank means, each of which is connected to the system bus and which together constitute the shared storage means;
    (b) a plurality of separate processor means provided for each of the data input means, the display means and the data storage means, respectively, for separately processing data for each of them, each of the separate processor means being connected to the system bus and being capable of generating a memory request command signal on the system bus for the purpose of transferring data between itself and any one of the memory bank means;
    (c) arbitration means within the shared storage means which is responsive to a memory request command signal generated by one of the processor means for generating separate enable signals to acknowledge occupation of one of the memory bank means by the one processor means which generated the memory request, the arbitration means including means for generating a sequence of separate timing signals whose periods define "time slots" and allocating the time slots to the plurality of memory bank means in sequence and synchronously with the bus clock of the system bus so that for each memory bank means there is a corresponding time slot, and wherein the enable signals are generated during the corresponding time slots; and (d) data dividing means for dividing data transferred between the one processor means and the one memory bank means into predetermined groupings of divisional data and for processing each divisional data in synchronization with the bus clock of the system bus and in simultaneous parallel fashion when a plurality of memory requests are out-putted simultaneously from a plurality of the processor means and wherein the data dividing means transfers divisional data between the one processor means and the one memory bank means through the system bus during a predetermined number of time slots after the time slot allocated to the one memory bank means.

3. The data processing system as set forth in claim 2, wherein the data dividing means transfers divisional data to another one of the memory bank means through the system bus a predetermined number of time slots after a time slot corresponding to any of the memory bank means for which there is no outstanding memory request.

4. The data processing system as set forth in claim 3, wherein the arbitration means additionally generates at least one time slot ("non-allocated time slot") which is not allocated to any of the memory bank means and wherein the data dividing means transfers divisional data to the one memory bank means through the system bus a predetermined number of time slots after the non-allocated time slot.

5. The data processing system as set forth in claim 2, wherein the time slots are selected to have a time duration which is shorter than the time required by any one of the memory bank means to write or read data.

6. The data processing system as set forth in claim 2, wherein the time slots are selected to have a time duration which is shorter than the data processing time required by any one of the processor means to process the data read by it through the system bus.

7. The data processing system as set forth in claim 1, wherein the system bus comprises:

(a) an address bus for transferring address data to designate an address of a memory location in the one memory bank means;

(b) a write data bus for transferring write data to be written in the memory location designated by the address data; and (c) a read data bus for transferring data read from the memory location designated by the address data, and wherein the data corresponding to the one memory bank means are outputted to the address data bus, the write data bus and the read data bus at different times for the one memory bank means according the sequence of the allocated time slots.

8. The data processing system as set forth in claim 1, wherein the plurality of processor means is comprised of one or more microprocessors.

9. The data processing system as set forth in claim 1, wherein one or more of the memory bank means comprises a dynamic RAM.

10. The data processing system as set forth in claims 1, 2, 3, or 4, wherein the arbitrating means further comprises means for selecting, in accordance with a predetermined priority order with respect to each processor means, one of a plurality of memory requests which are outputted simultaneously from two or more processor means to the same memory bank means and for processing data corresponding to the memory request selected on the basis of the predetermined priority.

11. The data processing system as set forth in claim 10, wherein the arbitrating means comprises a lock function such that a selection of other memory requests is refused until divisional data corresponding to one of the priority-selected memory requests have been processed.

12. A method of processing data using a data processing system of the type having a bus clock, a system bus and an address bus, the method being of the type having the steps of inputting data, storing data, processing data, and displaying data wherein the improvement comprises the steps of:

(a) storing data in a plurality of memory banks which are connected to each other by the system bus;

(b) separately processing data for each of the steps of inputting, storing, and displaying data, in separate data processors, each of the separate processing steps being carried out over the system bus, and outputting a memory request command signal on the system bus from one of the data processors for the purpose of transferring data between one of the memory banks and the one data processor;

(c) occupying the one memory bank while transferring data between the one processor and the one memory bank and generating an enable signal to acknowledge the occupation; and (d) simultaneously outputting a plurality of memory requests from a plurality of processors, dividing data to be transferred between the processors and the memory banks into predetermined groupings of divisional data, and processing each divisional data in synchronization with the bus clock of the system bus and in simultaneous parallel fashion.

13. The data processing method as set forth in claim 12, wherein (a) the memory bank occupying step comprises the steps of generating a sequence of separate timing signals whose periods define "time slots" and allocating the time slots to the plurality of memory banks in sequence and synchronously with the bus clock of the system bus so that for each memory bank there is a corresponding time slot and generating the enable signals during the corresponding time slots, and wherein (b) the data dividing step comprises transferring divisional data between the one processor and the one memory bank through the system bus during a predetermined number of time slots after the time slot allocated to the one memory bank.

14. The data processing method as set forth in claim 13, wherein the data dividing step comprises transferring divisional data to another one of the memory banks through the system bus a predetermined number of time slots after a time slot corresponding to any of the memory banks for which there is no outstanding memory request.

15. The data processing method as set forth in claim 14, wherein the arbitration additionally generates at least one time slot ("non-allocated time slot") which is not allocated to any of the memory banks and wherein the data dividing transfers divisional data to the one memory bank through the system bus a predetermined number of time slots after the non-allocated time slot.

16. The data processing method as set forth in claim 15, wherein the time slots are selected to have a time duration which is shorter than the time required by any one of the memory banks to write or read data.

17. The data processing method as set forth in claim 16, wherein the time slots are selected to have a time duration which is shorter than the data processing time required by any one of the processors to process the data read by it through the system bus.

18. The data processing method as set forth in claims 12, 13, 14, or 15, wherein the arbitrating step further comprises the steps of selecting, in accordance with a predetermined priority order with respect to each processor, one of a plurality of memory requests which are outputted simultaneously from two or more processor to the same memory bank and for processing data corresponding to the memory request selected on the basis of the predetermined priority.

19. The data processing method as set forth in claim 10, wherein the arbitrating step further comprises a lock step wherein the selection of other memory requests is refused until divisional data corresponding to one of the priority-selected memory requests have been processed.

* * * * *